United States Patent
Van Heugten

(10) Patent No.: US 12,078,874 B2
(45) Date of Patent: *Sep. 3, 2024

(54) ELECTRO-ACTIVE SPORTING GLASSES

(71) Applicant: e-Vision Smart Optics, Inc., Sarasota, FL (US)

(72) Inventor: Anthony Van Heugten, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,225

(22) Filed: Nov. 7, 2022

(65) Prior Publication Data
US 2023/0086352 A1     Mar. 23, 2023

Related U.S. Application Data

(63) Continuation of application No. 17/616,603, filed as application No. PCT/US2021/046646 on Aug. 19, 2021, now Pat. No. 11,526,029.
(Continued)

(51) Int. Cl.
*G02C 7/08*     (2006.01)
*F41G 1/14*     (2006.01)
(Continued)

(52) U.S. Cl.
CPC .............. *G02C 7/083* (2013.01); *F41G 1/14* (2013.01); *G02F 1/139* (2013.01); *G02F 1/133757* (2021.01)

(58) Field of Classification Search
CPC .......... G02C 7/08; G02C 7/081; G02C 7/083; G02C 7/085; G02C 7/086; G02C 7/088
See application file for complete search history.

(56) References Cited

U.S. PATENT DOCUMENTS 5,712,721 A     1/1998     Large
8,778,022 B2     7/2014     Blum et al.
(Continued)

FOREIGN PATENT DOCUMENTS

EP     2593040 B1     5/2013
JP     2007240709 A     9/2007
(Continued)

OTHER PUBLICATIONS

Algorri et al., "Recent Advances in Adaptive Liquid Crystal Lenses," Crystals 2019, 9, 272, 20 pages.
(Continued)

*Primary Examiner* — Christopher Stanford
*Assistant Examiner* — Journey F Sumlar
(74) *Attorney, Agent, or Firm* — Smith Baluch LLP

(57) ABSTRACT

An electro-active lens provides simultaneous focusing at two different optical powers. It does this with a stack of electro-active lens elements aligned along the same optical axis that each focus light in different polarization states (e.g., horizontal and vertical polarization states). If a first and second electro-active lens elements have different optical powers, light in a first polarization state can be focused to one optical power and light in a second polarization state can be focused to a different optical power simultaneously. The electro-active lens can be switched between different single and multiple optical powers. People with presbyopia may use the electro-active lens mounted in eyewear in place of conventional bifocal glasses. The electro-active lens may also be used in a scope to improve target aiming.

19 Claims, 18 Drawing Sheets

Related U.S. Application Data

(60) Provisional application No. 63/067,839, filed on Aug. 19, 2020.

(51) Int. Cl.
  *G02F 1/139* (2006.01)
  *G02F 1/1337* (2006.01)

(56) References Cited

U.S. PATENT DOCUMENTS

| | | |
|---|---|---|
| 8,915,588 B2 | 12/2014 | Blum et al. |
| 8,931,896 B2 | 1/2015 | Blum et al. |
| 9,124,796 B2 | 9/2015 | Blum et al. |
| 9,801,709 B2 | 10/2017 | Blum et al. |
| 10,092,395 B2 | 10/2018 | Blum et al. |
| 10,151,961 B2 | 12/2018 | Lu et al. |
| 10,159,563 B2 | 12/2018 | Blum et al. |
| 10,172,704 B2 | 1/2019 | Blum et al. |
| 10,345,656 B2 | 7/2019 | Li et al. |
| 10,353,429 B2 | 7/2019 | Blum et al. |
| 10,379,419 B1 | 8/2019 | Lu et al. |
| 10,379,575 B2 | 8/2019 | Blum et al. |
| 10,551,690 B2 | 2/2020 | Milton |
| 10,599,006 B2 | 3/2020 | Heugten et al. |
| 10,729,539 B2 | 8/2020 | Blum et al. |
| 10,795,411 B2 | 10/2020 | Blum et al. |
| 10,852,766 B2 | 12/2020 | Blum et al. |
| 10,955,707 B2 | 3/2021 | Li et al. |
| 11,054,714 B2 | 7/2021 | Heugten et al. |
| 11,327,385 B2 | 5/2022 | Rosen et al. |
| 11,526,029 B2 | 12/2022 | Heugten |
| 2005/0073739 A1 | 4/2005 | Meredith et al. |
| 2009/0213283 A1* | 8/2009 | Burlingame ............ G02C 7/101 349/14 |
| 2009/0256977 A1* | 10/2009 | Haddock ............... G02F 1/1339 156/60 |
| 2011/0234934 A1 | 9/2011 | Chang |
| 2015/0077658 A1 | 3/2015 | Pugh et al. |
| 2015/0138454 A1 | 5/2015 | Pugh et al. |
| 2017/0131568 A1 | 5/2017 | Haddock |
| 2017/0172729 A1 | 6/2017 | Blum et al. |
| 2018/0132698 A1 | 5/2018 | Galstian et al. |
| 2019/0110887 A1 | 4/2019 | Blum et al. |
| 2019/0302545 A1 | 10/2019 | Li et al. |
| 2019/0314147 A1 | 10/2019 | Blum et al. |
| 2020/0018962 A1 | 1/2020 | Lu et al. |
| 2020/0033693 A1 | 1/2020 | Lu et al. |
| 2020/0133021 A1 | 4/2020 | Belli et al. |
| 2020/0225511 A1 | 7/2020 | Blum et al. |
| 2020/0363835 A1 | 11/2020 | Blum et al. |
| 2021/0173430 A1 | 6/2021 | Blum et al. |

FOREIGN PATENT DOCUMENTS

| | | |
|---|---|---|
| WO | 2014026114 A2 | 2/2014 |
| WO | 2021138440 A1 | 7/2021 |

OTHER PUBLICATIONS

Chen et al., "A polarizer-free liquid crystal lens exploiting an embedded-multilayered structure." IEEE Photonics Technol. Lett. 2015, 27, 899-902.

International Search Report and Written Opinion in International Patent Application No. PCT/US2021/046646 mailed Nov. 9, 2021, 10 pages.

Lin et al., "Electrically tunable-focusing and polarizer-free liquid crystal lenses for ophthalmic applications," Opt. Express 21, 9428-9436 (2013).

Extended European Search Report in European App. No. 21859118. 8, dated Jun. 27, 2024, 5 pages.

* cited by examiner

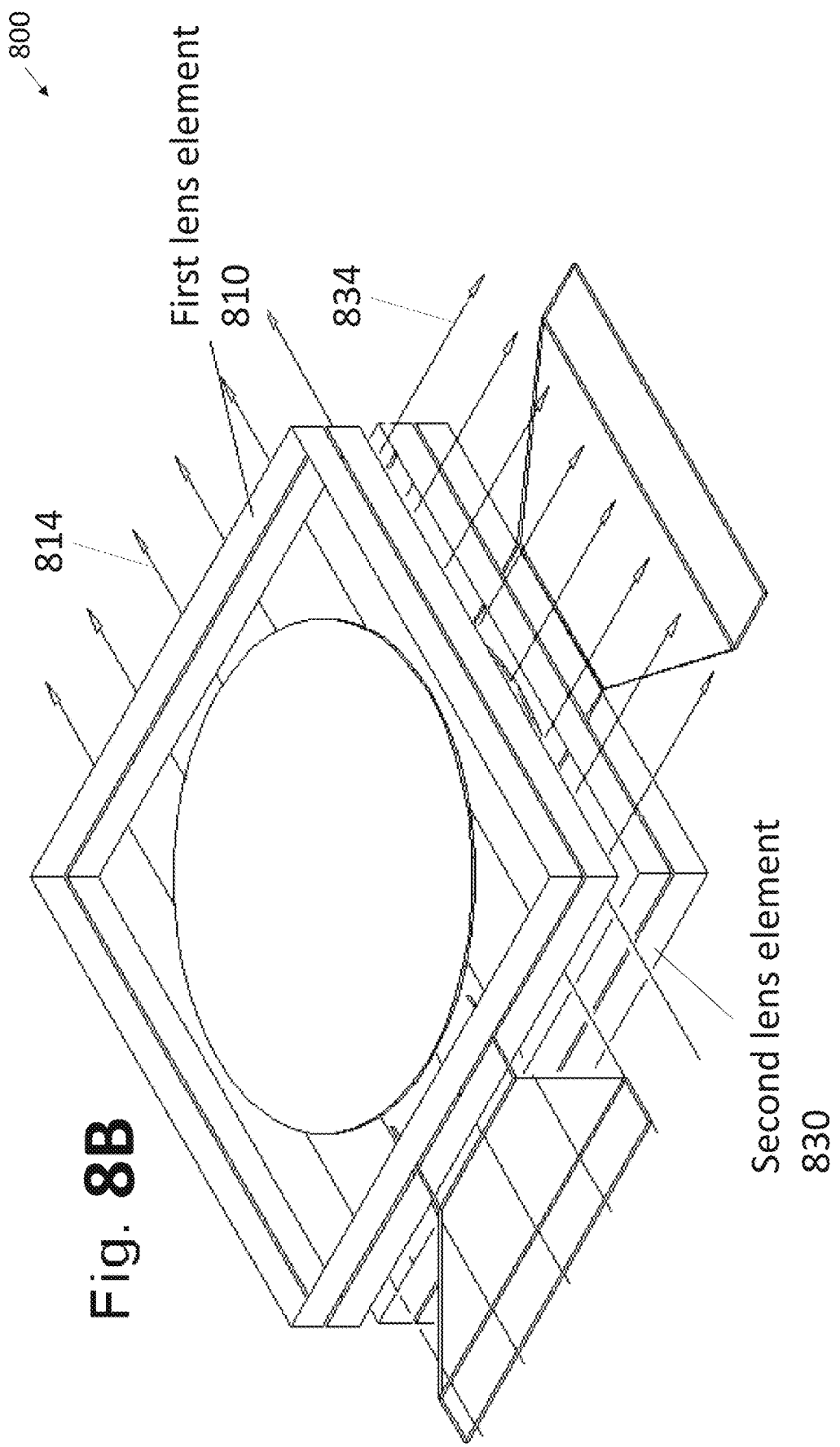

ELECTRO-ACTIVE SPORTING GLASSES

CROSS-REFERENCE TO RELATED APPLICATION(S)

This application is a continuation of U.S. application Ser. No. 17/616,603, filed on Dec. 3, 2021, which is a national-phase application, under 35 U.S.C. 371, of International Application No. PCT/US2021/046646, filed on Aug. 19, 2021, which in turn claims the priority benefit, under 35 U.S.C. 119(e), of U.S. Application No. 63/067,839, filed Aug. 19, 2020, which is incorporated herein by reference in its entirety for all purposes.

BACKGROUND

Eyesight can deteriorate as one ages. One way that eyesight can deteriorate with age is in the ability to switch focus between two different focal points at two different distances quickly. Younger people with good vision can typically switch their focus quickly between near and far objects. As people age, they can lose the ability to switch focus quickly. Another way that eyesight can deteriorate with age is in the ability to see near objects clearly, a condition called presbyopia.

A common treatment for presbyopia is wearing glasses with bifocal, trifocal, or progressive lenses. A bifocal lens has two areas with different powers. The top half of the bifocal lens has a vision prescription for objects far away. The bottom portion of the bifocal lens has a reading prescription for close objects. Similarly, a trifocal lens has three regions for focusing on objects at near, middle, and far distances. Bifocal and trifocal lenses typically have visible lines that indicate changes in prescription. Progressive lenses are similar to trifocal lenses, but they do not have a visible line indicating the change in prescription. Progressive lenses can be thought of as "seamless" trifocal lenses.

SUMMARY

There can be several disadvantages to wearing bifocal or progressive glasses. If a wearer of glasses with bifocal, trifocal, or progressive lenses wants to switch between the two different prescriptions in the lenses while looking in one direction, the wearer has to move their head or the glasses in order to change which part of the lenses the wearer is looking through. This movement can be detrimental in many activities, including in certain professions, sports, hobbies, and daily activities.

For example, one activity in which physical movement of the head may present a problem is when driving a car. When driving a car, the driver should be able to quickly switch their focus between the road far ahead and an approaching sign (e.g., for an exit ramp or street), both of which are in the driver's field of regard. If the driver needs to move their head in order to switch focus, the driver's reaction time may be slower. This can create dangerous driving conditions.

Physical movement of the head or glasses may present a problem when playing certain sports, such as shooting sports, billiards, and racket sports. For example, when shooting a rifle, the person shooting may want to switch focus rapidly between the rifle's aiming beads and the target. Typically, the aiming beads are aligned to the target to successfully hit the target. If wearing bifocal or progressive lenses, the person shooting may need to move their head or glasses so that they can look through the different parts of the lenses. This movement impairs the person's ability to aim, which may have a detrimental effect on their performance.

An inventive electro-active lens system can provide simultaneous focusing at two different optical powers without head movement. It does this with a pair or a stack of electro-active lens elements (also called electro-active lenses) that focus light in different polarization states (e.g., orthogonal horizontal and vertical polarization states). For example, the first electro-active lens element may be configured to dynamically focus horizontally polarized light and transmit vertically polarized light, and the second electro-active lens element may be configured to dynamically focus vertically polarized light and transmit horizontally polarized light. If the first and second electro-active lens elements have different optical powers, horizontally polarized light can be focused to one plane and vertically polarized light can be focused to a different plane.

An inventive electro-active lens system may include an electro-active lens. The electro-active lens includes a first electro-active lens element configured to be switched between state A and state B. In State A, the first electro-active lens element provides a first optical power for light in a first polarization state and zero optical power for light in a second polarization state different than the first polarization state. In state B, the first electro-active lens element provides a second optical power different than the first optical power for light in the first polarization state and zero optical power for light in the second polarization state. The electro-active lens also includes a second electro-active lens element in optical series with the first electro-active lens element. The second electro-active lens element is configured to be switched between state C and state D. In state C, the second electro-active lens element provides a third optical power different than the first optical power and the second optical power for the light in the second polarization state and zero optical power for the light in the first polarization state. In state D, the second electro-active lens element provides a fourth optical power for light in the second polarization state and zero optical power for light in the first polarization state.

The first electro-active lens element may include a first liquid crystal layer and a first alignment layer having a first alignment direction. The second electro-active lens element may include a second liquid crystal layer and a second alignment layer having a second alignment direction orthogonal to the first alignment direction.

The first electro-active lens element may include a first substrate, a first plurality of electrodes, a first alignment layer, a second substrate, an electrically conductive coating, a second alignment layer, and a liquid crystal material. The first plurality of electrodes may be disposed on a surface of the first substrate. The first alignment layer may be disposed on the first plurality of electrodes and a portion of the first substrate. The second substrate may be coupled to the first substrate forming a first cavity. The electrically conductive coating may be disposed on a surface of the second substrate. The second alignment layer may be disposed on the electrically conductive coating. The liquid crystal material may be disposed in the first cavity between the first alignment layer and the second alignment layer. The first plurality of electrodes may include a plurality of concentric ring electrodes. The liquid crystal material may include a nematic liquid crystal material. The first alignment layer may be aligned parallel with the second alignment layer. Alternatively, the first alignment layer may be aligned anti-parallel with the second alignment layer.

The first electro-active lens element may be configured to be switched between state A and state B independently of the second electro-active lens element state. In one embodiment, neither the first electro-active lens element nor the second electro-active lens element includes a polarizer.

The first optical power level in the first electro-active lens element may be between about ¼ Diopters and about 5 Diopters. The second optical power level in the first electro-active lens element may be between about 0 Diopters and about 5 Diopters. The third optical power level in the second electro-active lens element may be between about ¼ Diopters and about 5 Diopters. The fourth optical power level in the second electro-active lens element may be between about 0 Diopters and about 5 Diopters. The first optical power level in the first electro-active lens element may be different than the third optical power level in the second electro-active lens element. The second optical power level in the first electro-active lens element may be the same as the fourth optical power level in the second electro-active lens element.

The electro-active lens element may be configured to be switched between state A and state B via at least one of a (mechanical) switch, voice actuation, or an eye movement. The second electro-active lens element may be configured to be switched between state C and state D via at least one of a (mechanical) switch, voice actuation, or an eye movement. The first polarization state may be orthogonal to the second polarization state.

The electro-active lens may also include a third electro-active lens element in optical series with the first electro-active lens element and the second electro-active lens element. The third electro-active lens element may be configured to be switched between state E in which the third electro-active lens element provides a fifth optical power different than the first optical power, the second optical power, and the third optical power for the light in a third polarization state and zero optical power for the light in the first polarization state and the second polarization state, and state F in which the third electro-active lens element provides a sixth optical power for light in the third polarization state and zero optical power for light in the first polarization state and second polarization state.

The electro-active lens may be included in a gun scope. The gun scope may be configured to be mounted on a gun. The first electro-active lens element and the second electro-active element may be configured to be switched between states via a mechanical switch disposed adjacent to a trigger guard on the gun. Alternatively, the electro-active lens may be disposed in at least one of spectacles, a contact lens, or an intraocular lens.

Another embodiment of the present technology is a method of operating an electro-active lens. The method includes applying a first voltage to the first electro-active lens element to switch the first electro-active lens element from state A to state B. The method also includes applying a second voltage different than the first voltage to the second electro-active lens element to switch the second electro-active lens element from state C to state D.

Another embodiment of the present technology is a gun scope. The gun scope includes a housing, an electro-active lens, a processor, and a power source. The electro-active lens and the processor are disposed in the housing and electrically coupled to each other. The power source is electrically coupled to the processor. The processor individually switches the first electro-active lens element and the second electro-active lens element.

The gun scope may include a switch. The switch may be disposed on an outer surface of the housing and electrically coupled to the processor to allow a user to control the electro-active lens. The gun scope may also include a wireless communication receiver coupled to the processor to receive a signal from an external switch to allow a user to control the electro-active lens.

Another embodiment of the present technology is a gun including a gun scope with a multifocal electro-active lens. The gun may also include a trigger and an external switch. The external switch may be mounted adjacent to the trigger within a distance of the user's hand so that the user's finger can switch the focus of the electro-active lens without changing a grip or position of the user's hand.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. 8B shows a perspective view of the electro-active lens in FIG. 8A.

DETAILED DESCRIPTION

Figure 1A:
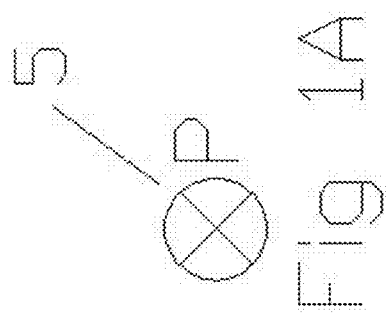
FIGS. 1A-1C illustrate notations for linearly polarized light.

An inventive electro-active lens can focus light in different polarization states to different focal planes at the same time. Unlike a conventional electro-active lens, an inventive electro-active lens can focus different polarization states with different optical powers simultaneously because it does not include any polarizers. Conventional electro-active lenses typically include electro-active elements that are polarization dependent; that is, they typically operate only on polarized light. Because of this dependence, conventional electro-active lenses typically include polarizers to attenuate light that is not in the appropriate polarization state or polarization switches (e.g., switchable wave plates) to switch light into the appropriate polarization state. Instead of using polarizers or polarization switches to correct for the polarization dependence of the lens elements, an inventive electro-active lens system takes advantage of this polarization dependence to focus unpolarized light with multiple optical powers simultaneously.

An electro-active lens includes at least two electro-active (e.g., liquid crystal) lens elements with coincident optical axes that provide different optical powers. Each lens element has two eigenaxes that are orthogonal to each other and to the optical axis. Each lens element focuses light polarized along a first eigenaxis with a different optical power when on and transmits light polarized along the other (second) eigenaxis when on and when off. The lens elements are rotated with respect to each other about the optical axis by 90 degrees so that the first eigenaxis of the first lens element is aligned with the second eigenaxis of the second lens element and the first eigenaxis of the second lens element is aligned with the second eigenaxis of the first lens element.

The amount of focus, i.e., the optical power, provided along the first eigenaxis of each lens element depends on the liquid crystal thickness and applied voltage, among other things, and can be tuned continuously (e.g., between a −5 and +5 diopters) or switched among two or more discrete states (e.g., in 0.5 or 1.0 diopter increments between 0 and 5 diopters). (Other ranges and values of optical power are also possible.) Each lens element can provide no (zero) optical power along the first eigenaxis when it is off (when no voltage is applied) or can provide a non-zero optical power along the first eigenaxis when it is off. The lens elements are configured to be controlled independently so that operation of one lens element does not affect operation of another lens element. In other words, the optical power in each lens element can be switched independently to provide different optical powers with no moving parts.

An alternative electro-active lens system includes three lens elements. In the same way that two lens elements can provide two distinct, simultaneous focus points, three lens elements can provide three distinct, simultaneous focus points. Each lens element in the three-lens element system focuses light polarized along a different direction with a different optical power when on and transmits light polarized along other directions when on and when off. The lens elements are rotated with respect to each other about the optical axis by an angle less than 90 degrees. For example, each lens element may be rotated 45 degrees about the optical axis with respect to other lens elements.

The electro-active materials used in the lens elements may include liquid crystal materials, such as nematic liquid crystal materials and other planar-aligned or homeotropic aligned liquid crystal materials.

An inventive electro-active lens may also include one or more static optical structures that focus light. These static optical structures may include simple lens structures (e.g., convex lenses, concave lenses, and/or meniscus lenses), compound lens structures (e.g., combinations of simple lenses), and/or non-spherical lens structures (e.g., Fresnel lenses, and/or gradient index lenses). These structures may contain or form parts of the electro-active lens elements themselves (e.g., they may etched or shaped in the substrates of the electro-active lens elements).

Polarization States and Liquid Crystal Alignment Directions

Figure 1B:
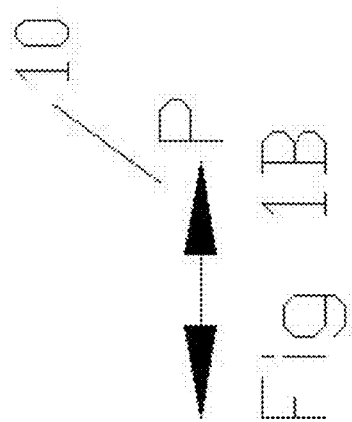
Figure 1C:
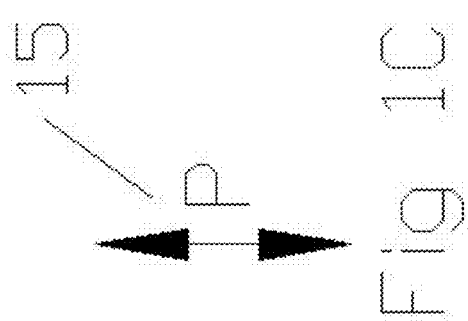

FIGS. 1A, 1B, and 1C show symbols used in this disclosure to describe different linear polarization orientations or states. Symbol 5 in FIG. 1A indicates linear polarization that is "going into and out of the flat plane of the figure." Symbol 10 in FIG. 1B indicates linear polarization that is orthogonal to the direction indicated by symbol 5. In this case, the direction of the linear polarization is "left and right across the flat plane of the figure." Symbol 15 in FIG. 1C indicates linear polarization that is also orthogonal to the directions indicated by symbols 5 and 10. The direction of the linear polarization indicated by symbol 15 is "up and down across the flat plane of the figure."

Figure 2A:
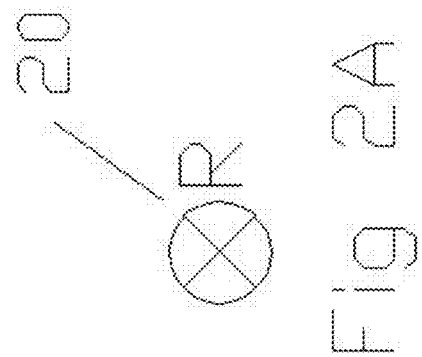
FIGS. 2A-2C illustrate notations for liquid crystal alignment (rub) directions.
Figure 2B:
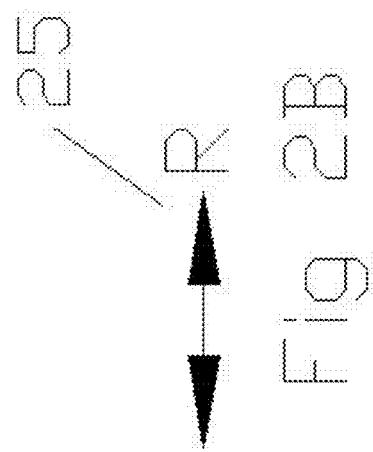
Figure 2C:
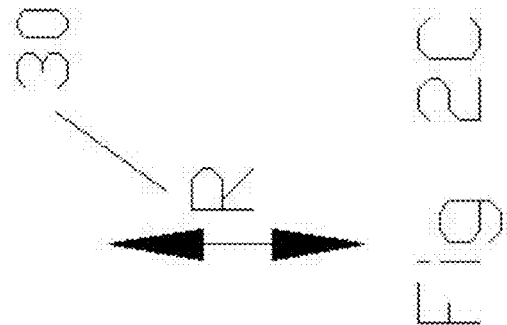
Figure 3:
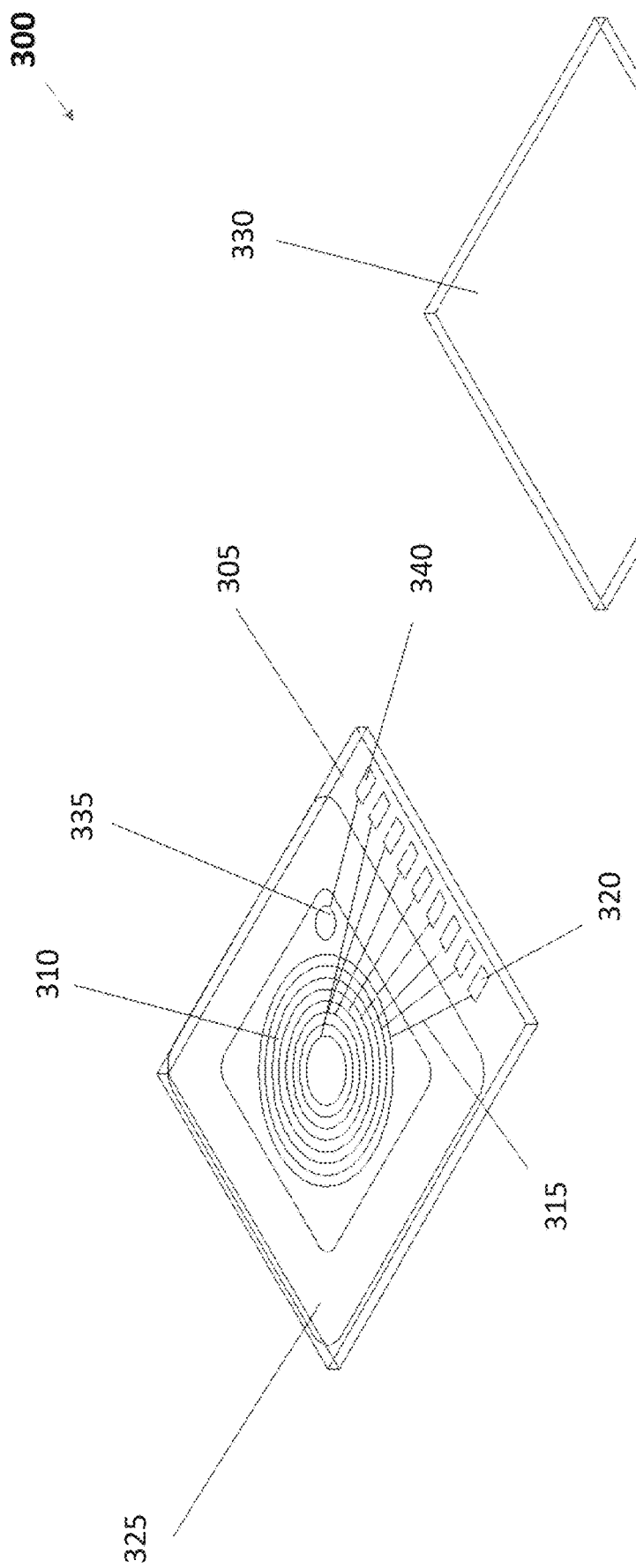
FIG. 3 shows an electro-active lens element having two substrates prior to assembly.

FIGS. 2A, 2B and 2C show the symbols used in this disclosure to describe the orientation of the rub or alignment directions of the alignment layers used in the liquid-crystal focus changers (electro-active lens elements). Symbol 20 in FIG. 2A indicates a direction that is "going into and out of the flat plane of the figure." Symbol 25 in FIG. 2B indicates that the rub direction is orthogonal to the direction indicated by symbol 20; it is "left and right across the flat plane of the figure." Symbol 30 in FIG. 2C indicates that the rub direction is orthogonal to the directions indicated by symbols 20 and 25, with the rub direction "up and down across the flat plane of the figure." Each liquid-crystal lens typically has two alignment layers—one on either side of the liquid crystal material—whose rub directions may be parallel, anti-parallel, or orthogonal to each other. In some cases, only one alignment layer may be used for cost reduction. Using two alignment layers increases both the switching speed and the width of the field of view.

The symbols shown in FIGS. 1A-1C and 2A-2C indicate relative directions. Different symbols can be used to indicate the same polarization state in different drawings if those drawings are from different perspectives. Similarly, the same symbol can be used to indicate different polarization states in different drawings if those drawings are from different perspectives. For example, in a side or profile view of an optical component, symbol 5 may indicate a horizontal polarization state and symbol 10 may indicate a vertical polarization state. In an end-on view (i.e., a view along the optical axis) of the same optical component, symbol 10 may indicate the horizontal polarization state and symbol 15 may indicate the vertical polarization state.

Electro-Active Lens Elements for Simultaneous Focus at Different Depths

FIGS. 3-7 illustrate an electro-active lens element 300 suitable for use in an inventive electro-active lens. A first side of the multifocal electro-active lens element 300 includes a first substrate 305 with circular electrodes 310 patterned onto a surface of the first substrate 305. The circular electrodes 310 are made of a transparent conductive material (e.g., indium tin oxide (ITO)). The electrodes may be deposited on the first substrate 305 by depositing a layer of conductive material on a surface of the first substrate 305 and then patterning the conductive material layer using lithography. A transparent conductive material coating is also disposed on a second substrate 330 on the second side of the multifocal electro-active lens element 300. This transparent conductive material coating is not patterned and acts as a ground plane.

Insulating layers (e.g., $SiO_2$) may be disposed on the electrodes 310 on the first substrate 305 and the conductive layer on the second substrate 330. The insulating layer may be patterned with small via holes to electrically couple the electrodes 310 and the conductive layer on the second substrate 330 to a power source. The configuration of via holes on the first substrate 305 is discussed in more detail below with regard to FIG. 7. One or more via holes may be patterned on the second substrate 330. Preferably, only one via hole is used to couple the conductive layer on the second substrate 330 to a power source and the via hole is positioned outside of the area coinciding with the electrodes 310 on the first substrate 305 when the first substrate 305 and the second substrate 330 are coupled together.

The circular electrodes 310 are electrically coupled to electrical pads 320 via buss lines 315. These electrical pads 320 may be formed of a transparent conductive material, such as ITO, or an opaque material, such as nickel, that is deposited on the first substrate 305 and then patterned using lithographic techniques. Electrical pad 340 is electrically coupled to crossover dot 335, serving as the grounded side of the electrical circuit. One or more buss lines are used to electrically couple the grounded side of the electrical circuit on the first substrate 305 to the conductive coating on the second substrate 330 through one or more via holes in the insulating layer on the second substrate 330.

Crossover dot 335 electrically couples pad 340 on the first substrate 305 and the conductive coating on the second substrate 330. The crossover dot 335 includes several electrically conductive beads disposed on a surface of the crossover dot 335. The two sides of the electro-active lens element 300 are coupled together so that the circular electrodes 310 on the first substrate 305 face the transparent conductive coating on the second substrate 330. Electrically conductive beads on the crossover dot 335 electrically couple to the transparent conductive coating on the second substrate 330. The coupling between the crossover dot 335 and the conductive coating on the second substrate 330 provides a ground circuit connection at pad 340 that is electrically isolated from the other conductive features (circular electrodes 310 and electrical pads 320) on substrate 305. With this configuration a single electrical connector with multiple independent electrical lines (e.g., a flex ribbon connector) can be used to connect the lens element 300 to a power source and/or processor for controlling the electro-active lens element 300, rather than using two separate electrical connectors to electrically couple the working and ground circuit elements on the substrate 305. The two substrates 305 and 330 may be coupled with an adhesive disposed on glue line 325 on the first substrate 305 (and/or on the second substrate 330). Spacer beads may be disposed between the two substrates 305 and 330 to provide a uniform thickness (e.g., about 10 µm to about 15 µm) for the sealed cavity formed between the substrates 305 and 330. A liquid crystal material (e.g., Merck MLC-2140; not shown) is disposed in the cavity between the two substrates 305 and 330 before the cavity is sealed with adhesive to form the lens element 300.

Figure 4:
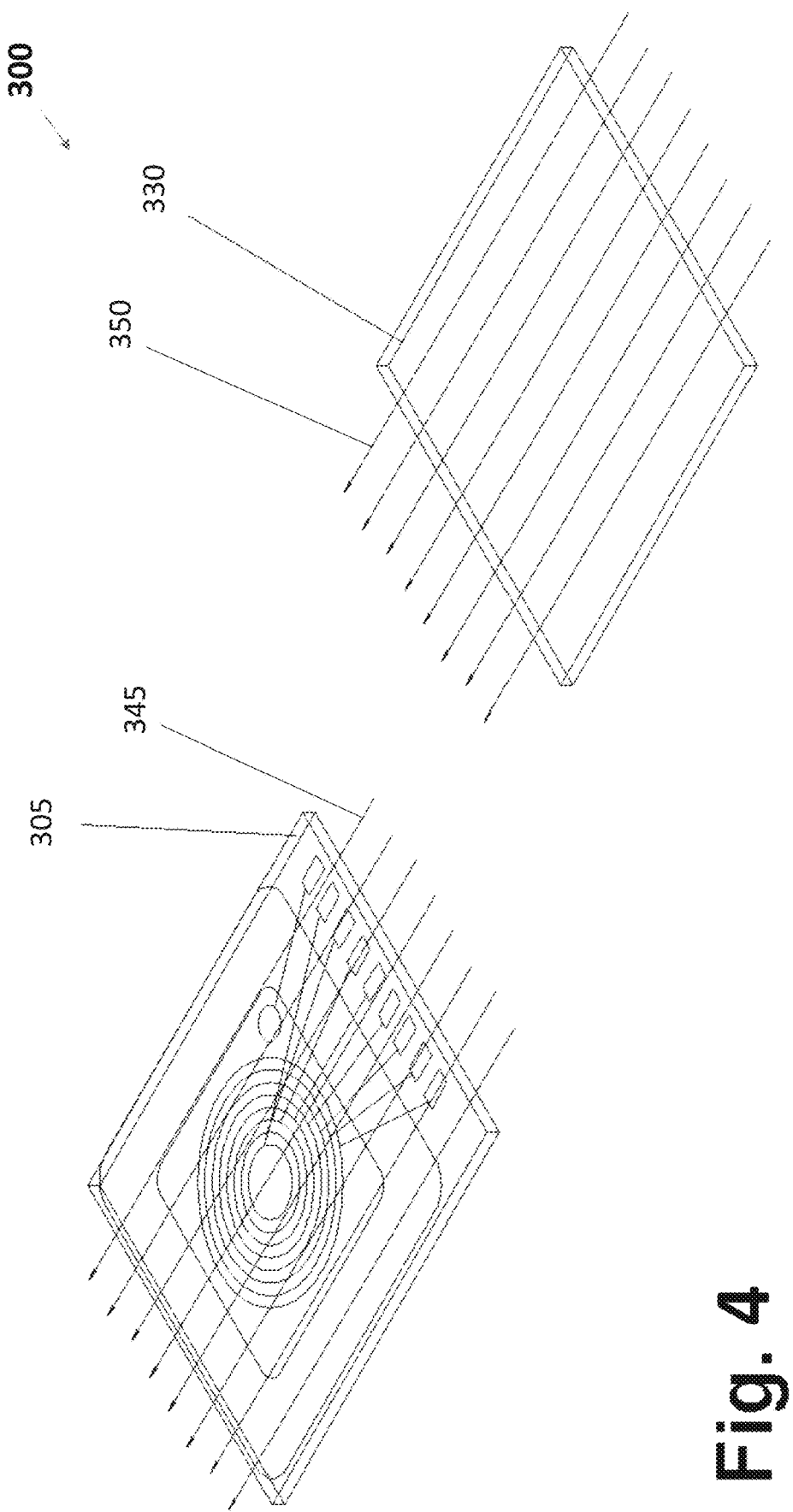
FIG. 4 shows polarization alignment on the electro-active lens element in FIG. 3.
Figure 5:
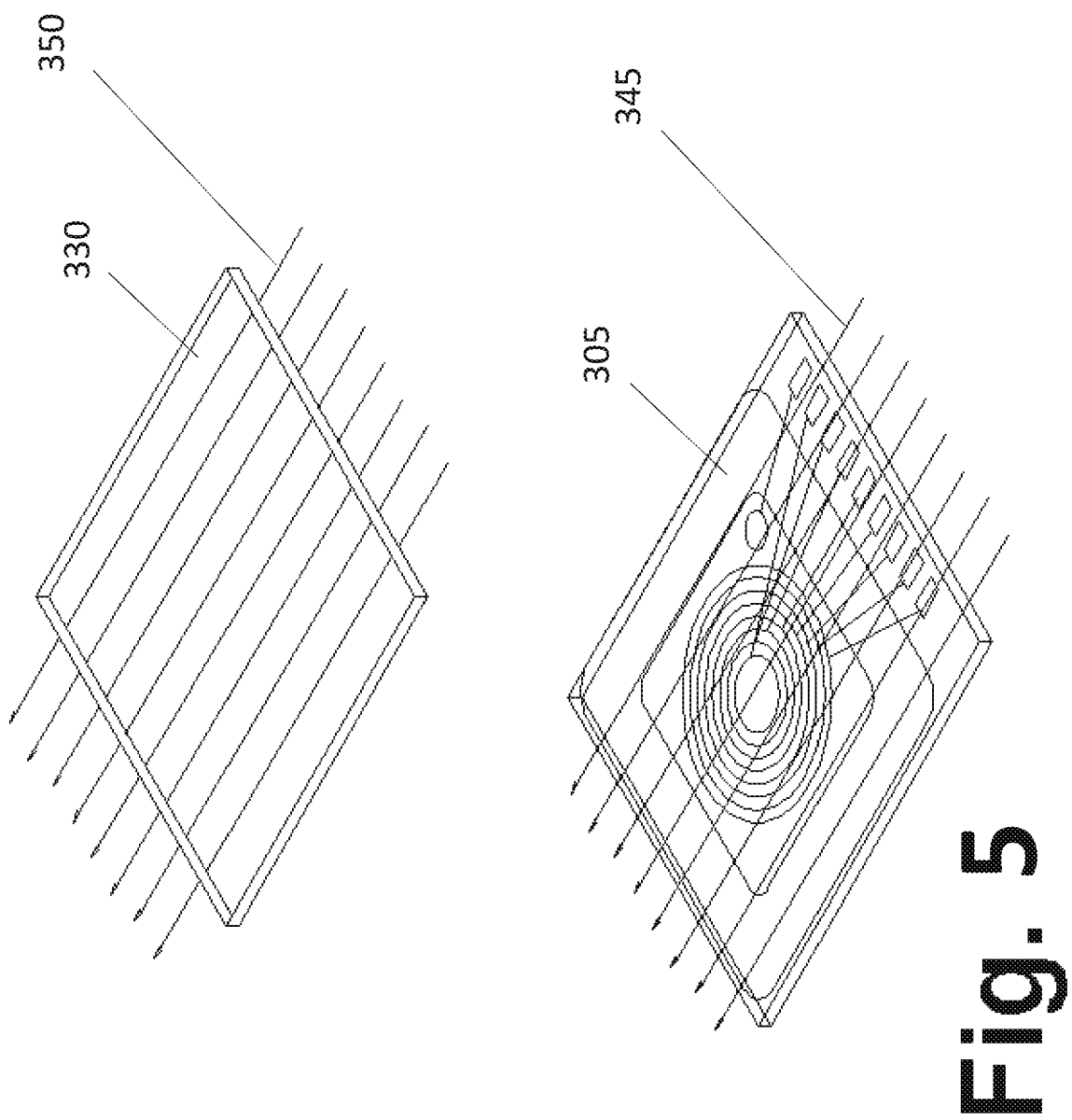
FIG. 5 shows an exploded view of the electro-active lens element in FIG. 3.
Figure 6:
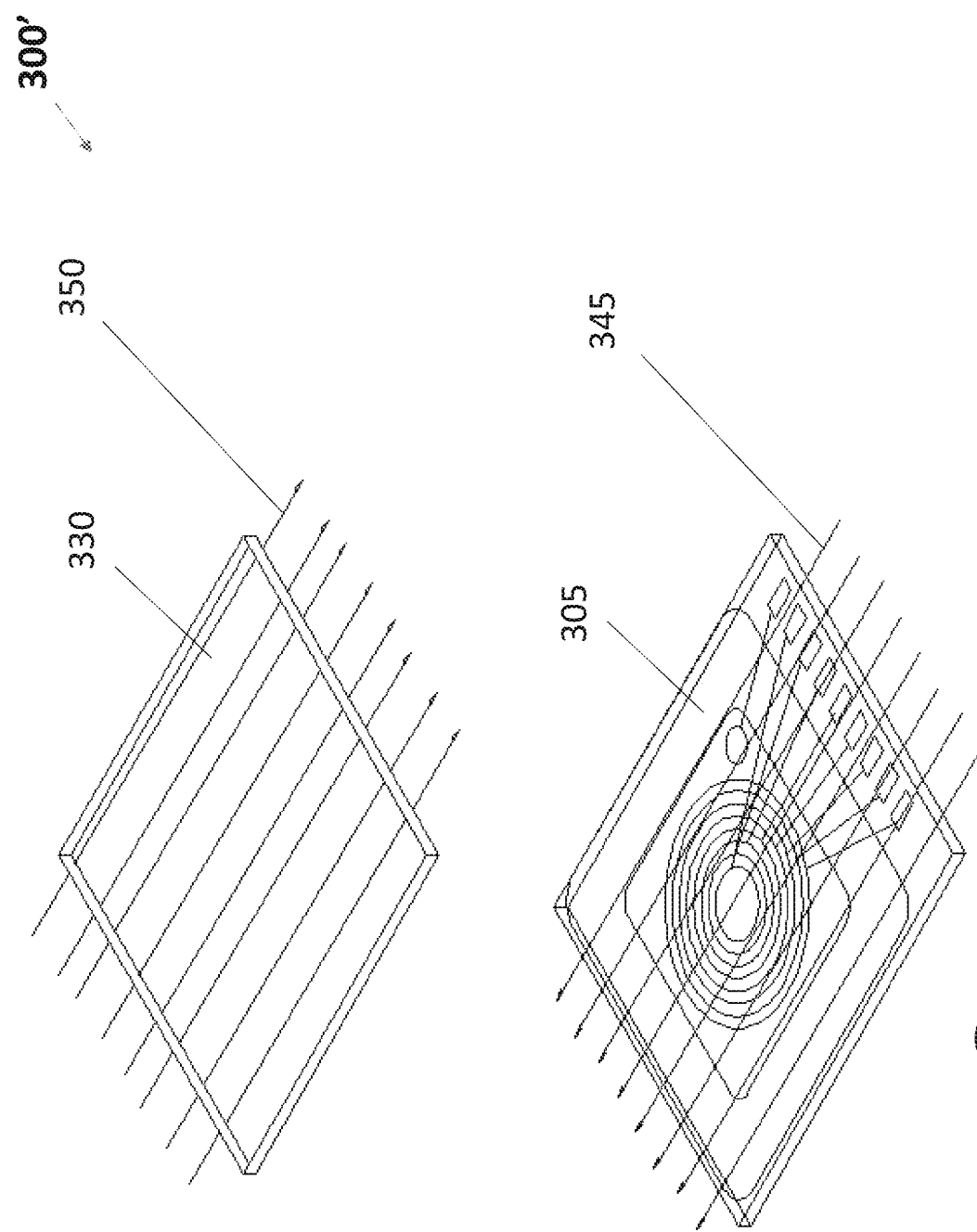
FIG. 6 shows an exploded view of another electro-active lens element.

FIG. 4 shows the alignment layers on the substrates 305 and 300 and their rub/alignment directions 345 and 350, respectively. Each alignment layer may be formed of polyimide or another suitable material and is disposed over the substrate surface and electrodes that face the liquid crystal material when the lens element 300 is fully assembled. The alignment directions 345 and 350 determine how the liquid crystal molecules align themselves with respect to the substrates 305 and 330. They are fixed by rubbing the polyimide with a felt cloth or exposing the polyimide to ultraviolet (UV) light that is linearly polarized along the desired alignment direction. The two substrates 305 and 330 can be oriented and assembled so that the alignment directions 345 and 350 are aligned parallel (as shown in the exploded view of the assembled lens element in FIG. 5) or antiparallel (as shown in the exploded view of the assembled lens element FIG. 6) to each other. Because the liquid crystal molecules are birefringent, the alignment directions 345 and 350 determine the eigenaxes of the liquid crystal lens, with the first eigenaxis parallel to the alignment directions 345 and 350 and the second eigenaxis perpendicular to the alignment directions 345 and 350.

Figure 7:
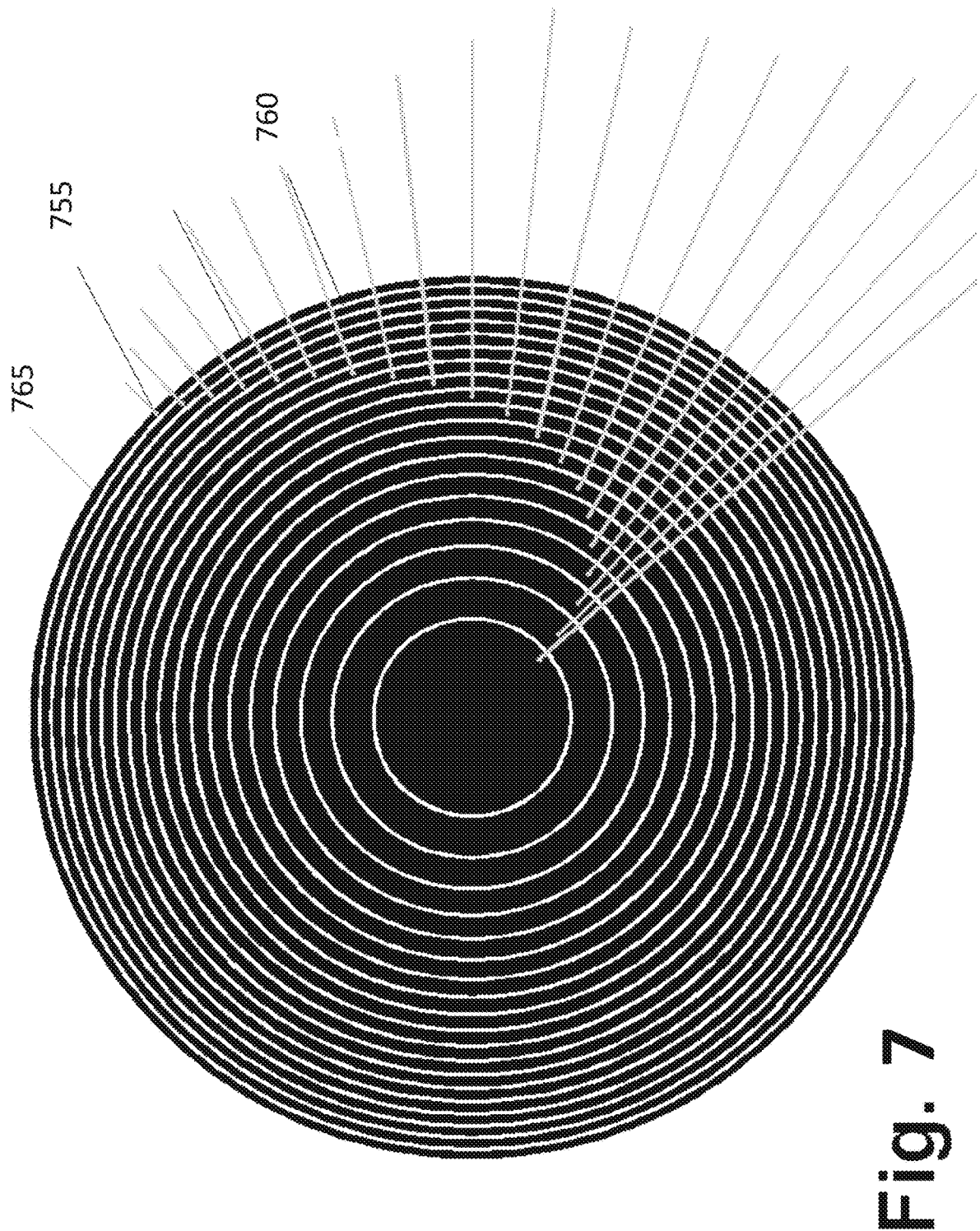
FIG. 7 shows the electrodes in the electro-active lens element of FIG. 3 without the electrical connections that supply power to the electrodes.

FIG. 7 shows concentric circular electrodes 765 suitable for use in the electro-active lens element 300 of FIGS. 3-6. The circular electrodes 765 are typically made from a transparent but electrically conductive material such as ITO, patterned on a transparent substrate, such as glass or plastic. Between each electrode 765 is a gap 760 without conductive material to prevent electrical connection between the electrodes 765. The gaps 760 (nineteen shown) may be either left unfilled or filled with a non-conductive material, for example, silicon dioxide ($SiO_2$). In many cases, it is desirable to make this gap as small as possible, with typical gap sizes of 1 to 3 microns. Smaller or larger gaps are also possible. In this example, twenty electrodes 765 are shown, but many more are typically used, perhaps hundreds or thousands.

An insulating layer may be disposed on top of the circular electrodes 765 and gaps 760. This insulating layer may be made from a material that does not conduct electricity but is optically transparent, for example, a 125 nm thick layer of $SiO_2$ deposited over the electrodes 205. A series of holes may be patterned in the insulating layer to expose a section of each underlying electrode 765. These holes connect the electrodes 765 to a power supply.

FIG. 7 shows the electrical connections 755, also called buss lines, (twenty shown) made to supply power to the electrodes 765. The buss lines 755 are made from an electrically conductive material, for example, nickel. They are typically about 10 microns wide, but can be narrower (e.g., 1 micron) if space is limited and power conduction is low or wider (e.g., 100 microns) if power conduction is higher. Each buss line 755 may be up to about 10 mm long (e.g., 2 mm, 4, mm, 6 mm, 8 mm, or 10 mm long), or more, depending on the size of the lens.

In operation, the buss lines 755 provide electrical power to the electrodes 765. Each buss line 755 delivers power only to its designated electrode 765 and not to any other electrode 765. The insulating layer prevents the buss lines 755 from shorting out or connecting to the other electrodes adjacent to it, and only allows connection of the buss line 755 to the desired electrode 765 through the via hole in the insulating layer.

The example electrodes shown in FIG. 7 use one buss line per electrode. In other embodiments, there are resistors or resistive bridges connect some of the adjacent electrodes, so that only a subset of the electrodes are connected to buss lines. The electrodes that aren't connected to buss lines are powered by current delivered via resistive bridges and adjacent electrodes. This reduces the number of buss lines and electrical drive channels, which can improve optical quality. In one embodiment, (curved) resistive bridges disposed within the same plane as the electrodes 765 connect respective pairs of neighboring electrodes 765. These resistive bridges are disposed within the gap between electrodes or are connected at break points in electrodes. In another embodiment, the resistive bridges are raised above the plane of the electrodes 765. Raised resistive bridges may be disposed on an insulating layer between the resistor and the electrodes, which are connected through the vias in the insulating layer. For more on resistive bridges, see, e.g., U.S. Pat. Nos. 10,599,006 and 10,551,690, which are incorporated herein by reference in their entireties.

Unlike a conventional electro-active lens element, the electro-active lens element 300 in FIGS. 3-7 does not include any polarizers. Because the liquid crystal layer in the electro-active lens element 300 is birefringent, it focuses light polarized along its alignment direction 345/350 when it is actuated and transmits light in the orthogonal direction whether or not it is actuated. Because the electro-active lens element 300 transmits unfocused light when actuated, the focused image produced by the electro-active lens element 300 may appear fuzzier, softer, or more out of focus than a focused image produced by a comparable conventional electro-active lens element.

Concentric ring electrodes are just one example of the configuration of electrodes that may be used in the electro-active lens elements. Other configurations include, for example, linear electrodes, oval electrodes, non-round electrodes, circular and/or non-round electrodes that are not completely closed (e.g., arcs instead of closed loops).

Electro-Active Lens with Simultaneous Focus at Different Depths

Figure 8A:
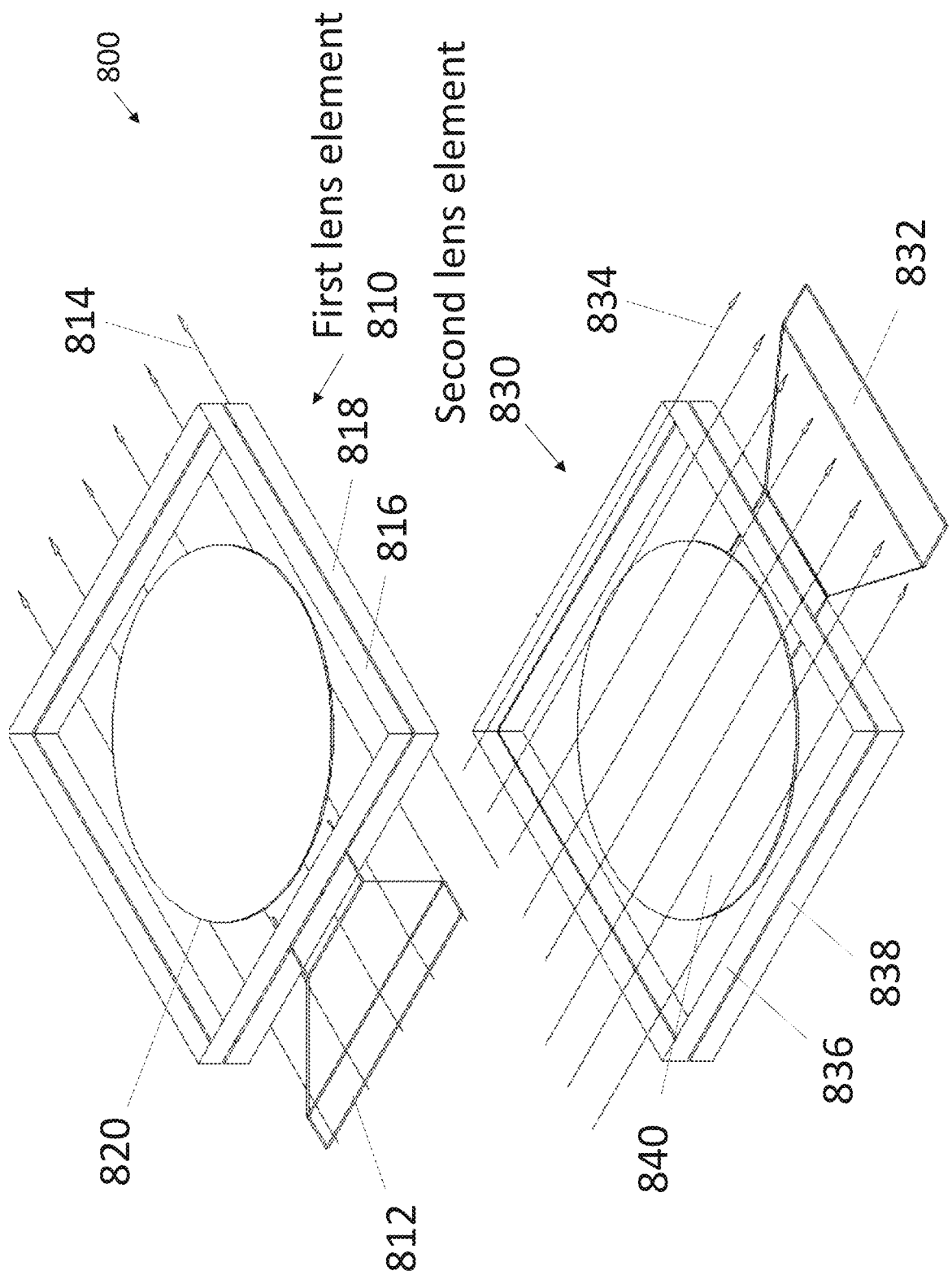
FIG. 8A shows an exploded view of an electro-active lens with two electro-active lens elements.

FIGS. 8A and 8B show exploded perspective and perspective views, respectively, of an electro-active lens 800 with two electro-active lens elements 810 and 830. The first lens element 810 includes a first substrate 816 and a second substrate 818. Electro-active area 820 on the first substrate 816 indicates where electrodes are patterned onto a surface of the first substrate 816. A transparent conductive coating, which acts as a ground plane, is disposed on a surface of the second substrate 818. The two substrates 816 and 818 are mated together so that electro-active area 820 on substrate 816 faces the conductive coating on substrate 818. A layer of liquid crystal material is sandwiched between the two substrates 816 and 818.

The second lens element 830 includes a first substrate 836 and a second substrate 838. As shown in FIGS. 8A and 8B, the first substrate 836 is distinct from the second substrate 818 of the first lens element 810; alternatively, the two lens elements 810 and 830 can share a common substrate with suitably patterned conductive material, alignment layers, and optional insulating layers on both sides. Electro-active area 840 indicates where electrodes are patterned onto a surface of the first substrate 836. A transparent conductive coating, which acts as a ground plane, is disposed on a surface of the second substrate 838. The two substrates 836 and 838 are coupled together so that electro-active area 840 on substrate 836 faces the conductive coating on substrate 838. A layer of liquid crystal material is sandwiched between the two substrates 816 and 818. This layer of liquid crystal material may have a different thickness, be of a different composition, and/or be actuated with different voltages or a different voltage profile than the layer of liquid crystal material in the first electro-active lens element 810. This enables the second electro-active lens element 830 to provide a different optical power than the first electro-active lens element 810. Electrical connections 812 and 832 provide electrical power to the patterned electrodes in the first lens element 810 and the second lens element 830, respectively.

FIG. 8B shows the electro-active lens 800 with the two lens elements 810 and 830 assembled together. The first and second lens elements 810 and 830 have different optical powers and are assembled so that their liquid crystal alignment directions 814 and 834 are orthogonal. In other words, the lens elements 810 and 830 are aligned so that their optical axes are coincident but their eigenaxes are rotated by 90° with respect to each other—the first lens element's focusing eigenaxis is parallel with the second lens element's transmitting eigenaxis, and the first lens element's transmitting eigenaxis is parallel with the second lens element's focusing eigenaxis. In this way, the first lens element focuses, for example, s-polarized light and transmits p-polarized light and the second lens element focuses p-polarized light and transmits s-polarized light (or vice versa).

Figure 9:
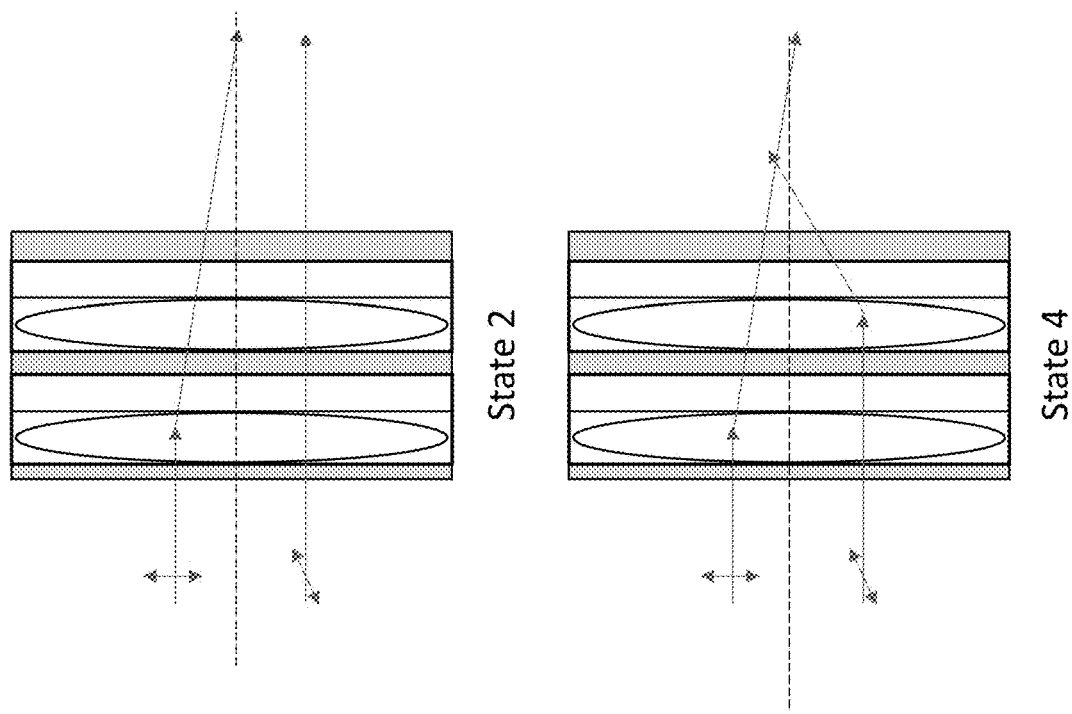
FIG. 9 shows four switching states for the electro-active lens in FIGS. 8A and 8B.
Figure 9:
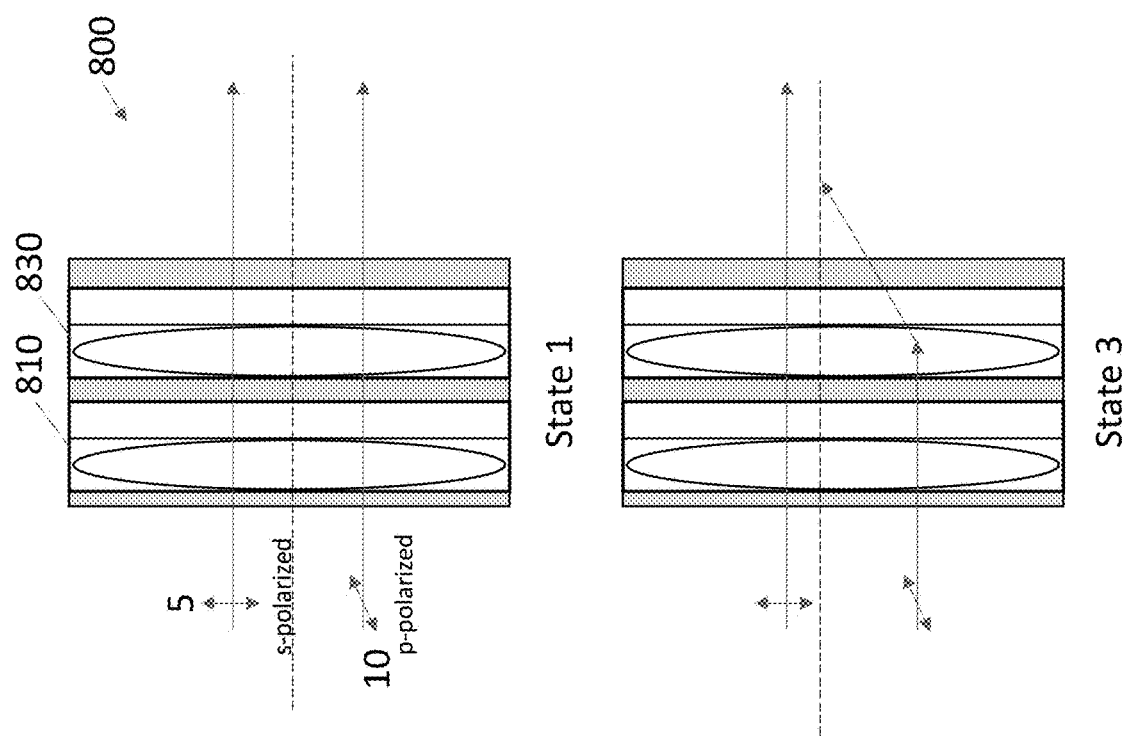

FIG. 9 shows the four different operation states for the electro-active lens 800. In this embodiment, the first lens element 810 focuses collimated s-polarized light 1001 to one focal plane and the second lens element 830 focuses collimated p-polarized light 1003 to a different focal plane. (This indicates that the lens elements 810 and 830 have different optical powers and can focus light from different distances to the same focal plane.)

In State 1 (upper left), the first lens element 810 and the second lens element 830 are in non-focusing states and so transmit light in any polarization state without any focusing.

In State 2 (upper right), the first lens element 810 is in a focusing state and the second lens element 830 is in a non-focusing state. In State 2, the first lens element 810 focuses s-polarized light and transmits p-polarized light and the second lens element transmits both s-polarized light and p-polarized light. The overall effect in State 2 is that some of the unpolarized light incident on the electro-active lens 800 is focused to a first plane (perpendicular to the point at which the angled ray intersects the optical axis) by the first lens element 810 and some of the incident unpolarized light is transmitted through the electro-active lens 800 without focusing.

In State 3 (lower left), the second lens element 830 is in a focusing state and the first lens element 810 is in a non-focusing state. In State 3, the second lens element 830 focuses p-polarized light and transmits s-polarized light and the first lens element 810 transmits both s-polarized light and p-polarized light. The overall effect in State 3 is that some of the unpolarized incident light is focused to a second plane (again, perpendicular to the point at which the angled ray intersects the optical axis) by the second lens element 830 and some of the light is transmitted through the electro-active lens 800 without focusing.

In State 4 (lower right), the first lens element 810 and the second lens element 830 are both in focusing states. In State 4, the first lens element 810 focuses s-polarized light and transmits p-polarized light and the second lens element 830 focuses p-polarized light and transmits s-polarized light. The overall effect in State 4 is that some of the collimated, unpolarized incident light is focused to a first plane by the first lens element 810 and some of the incident light is focused to a second plane by the second lens element 830.

Figure 10A:
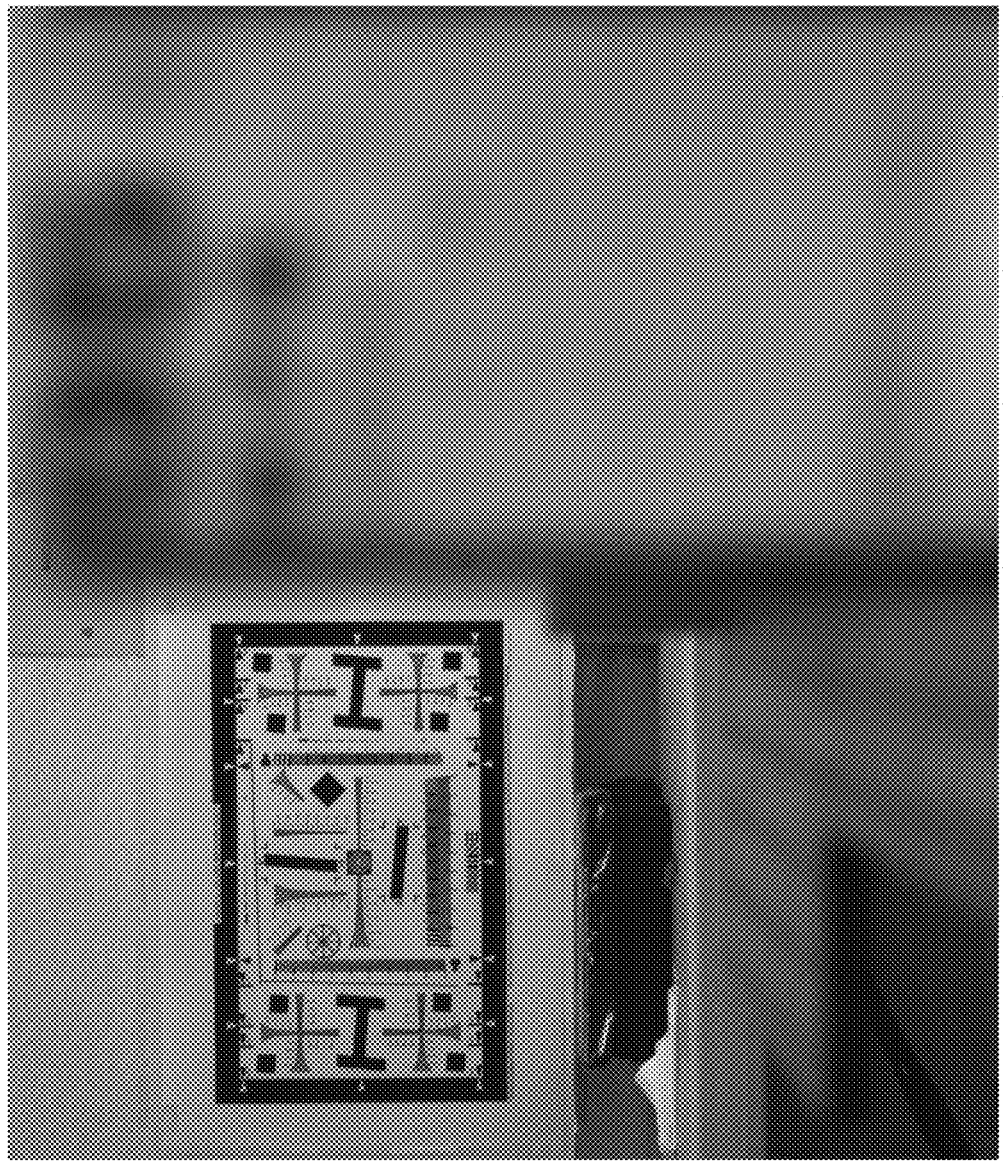
FIG. 10A is a picture taken through the electro-active lens of FIGS. 8A and 8B focused on a far object.
Figure 10B:
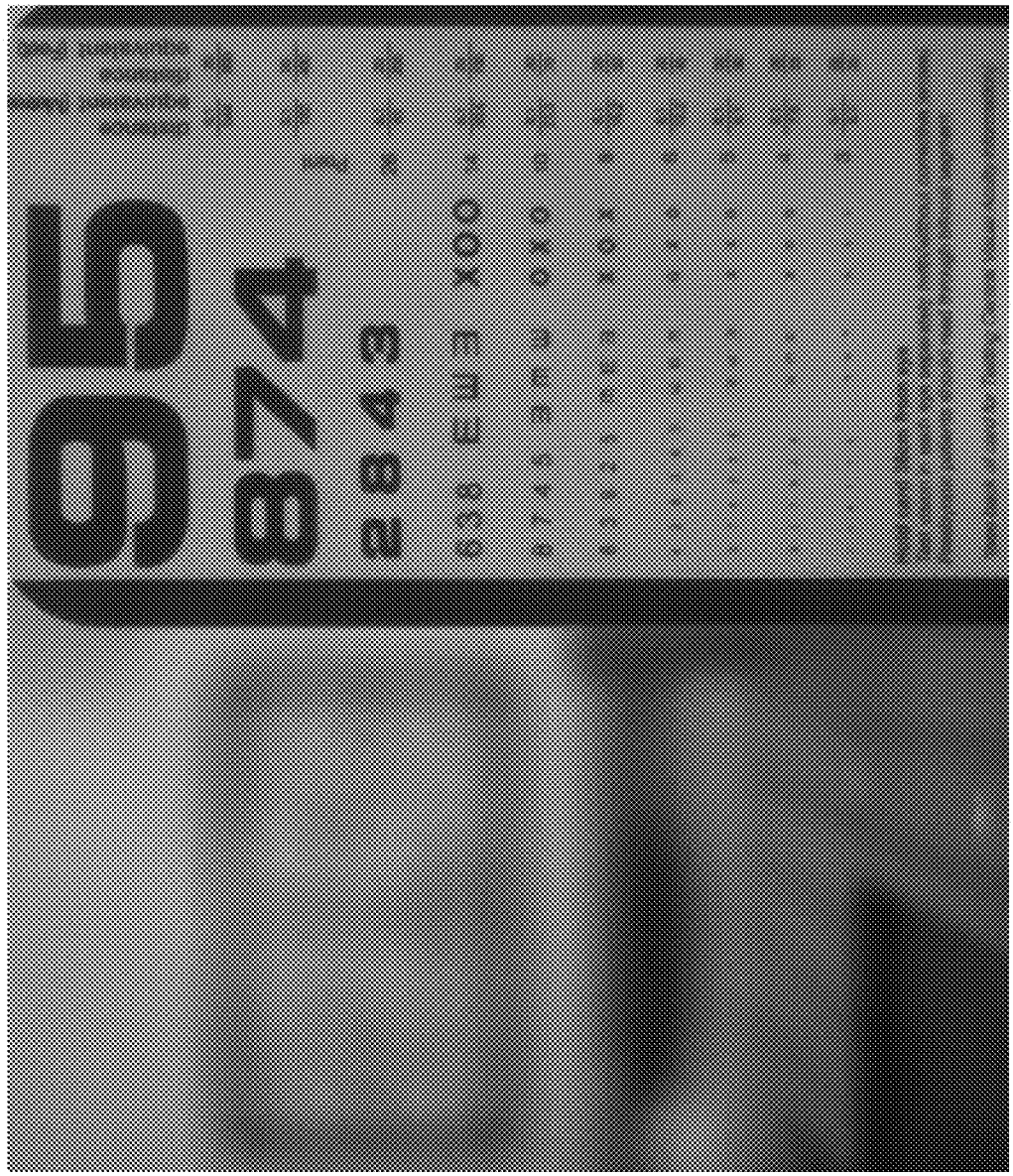
FIG. 10B is a picture taken through the electro-active lens of FIGS. 8A and 8B focused on a near object.
Figure 10C:
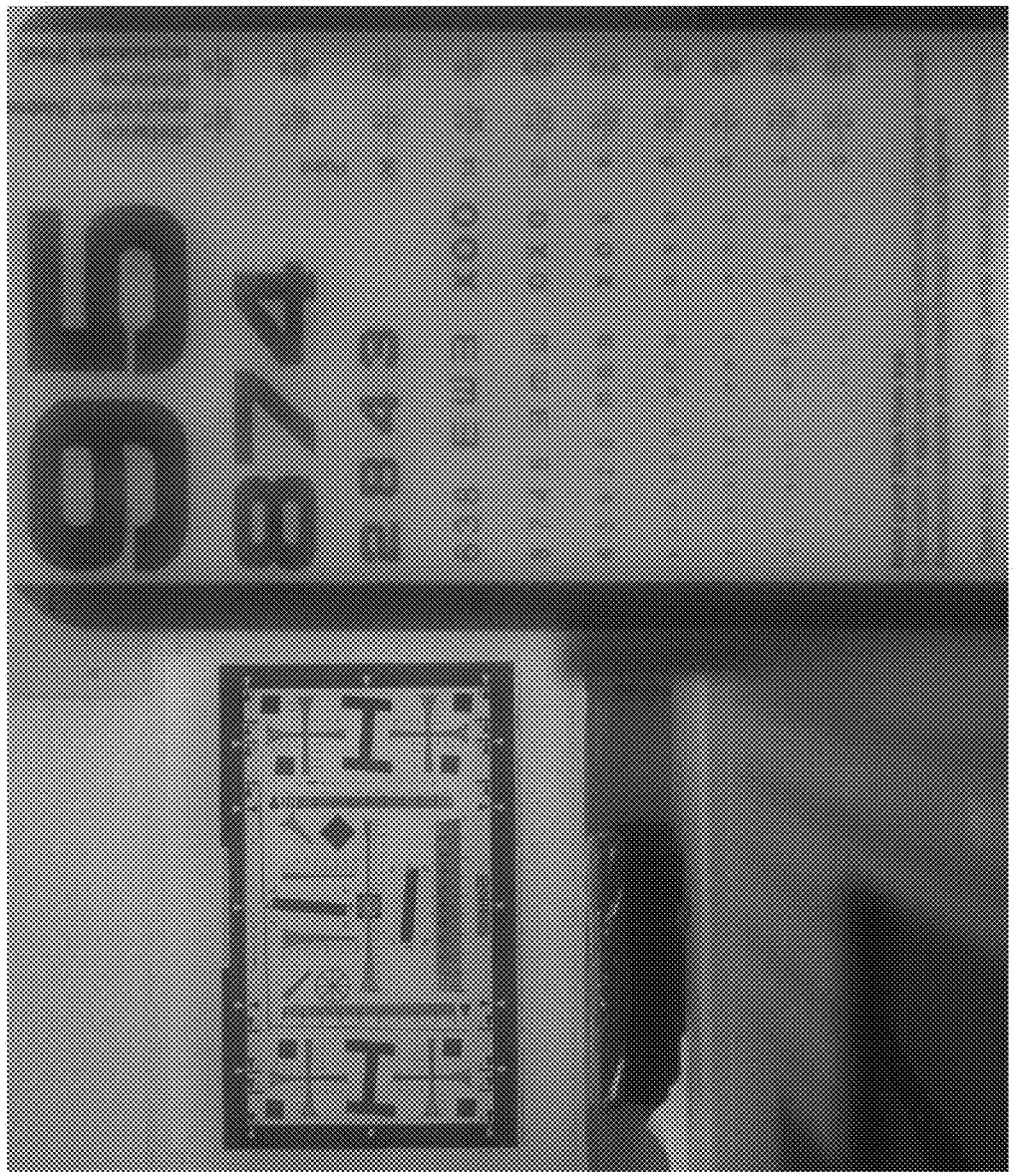
FIG. 10C is a picture taken through the electro-active of FIGS. 8A and 8B focused on far and near objects at the same time.

FIGS. 10A-10C show pictures taken using the electro-active lens 800 in States 2-4, respectively. In FIG. 10A, the electro-active lens 800 is in State 2, where the first lens element 810 is in a focusing state and the second lens element is in a non-focusing state. The first lens element 810 has an optical power selected to bring far objects into focus. The result is that the distant object (left) appears in focus while the near object (right) appears out of focus. In FIG. 10B, the electro-active lens 800 is in State 3, where the second lens element 830 is in a focusing state and the first lens element is in a non-focusing state. The second lens element 830 has an optical power that focuses near objects. The result is that the near object (right) appears in focus while the far object (left) appears out of focus. In FIG. 10C, the electro-active lens 800 is in State 4, where both the first and second lens elements are in focusing states. The result is that both the near object (right) and the far object (left) appear in soft focus (rather than the sharp focus produced by polarizing liquid crystal lenses).

More generally, in one embodiment, the first and second electro-active lens elements each have a transmitting state and a focusing state. In other words, the first electro-active lens element is switchable between a first focusing state in which the first electro-active lens element focuses light in the first polarization state and transmits light in the second polarization state and a first transmitting state in which the first electro-active lens element transmits light in the first and second polarization states. And the second electro-active lens element is switchable between a second focusing state in which the second electro-active lens element transmits light in the first polarization state and focuses light in the second polarization state and a second transmitting state in which the second electro-active lens element transmits light in the first and second polarization states.

This electro-active lens system can be used or operated by setting the first electro-active lens element to the first focusing state or the first non-focusing state; setting the second electro-active lens element to the second focusing state or the second non-focusing state; and sending the light through the first electro-active lens element and the second electro-active lens element. If the first electro-active lens element is in the first focusing state, and the second electro-active lens element is in the second non-focusing state, the system focuses the light in the first polarization state with the first electro-active lens element and transmits the light in the second polarization state through the first electro-active lens element and the second electro-active lens element without focusing the light in the second polarization state. If the second electro-active lens element is switched from the second non-focusing state to the second focusing state, the second electro-active lens element focuses the light in the second polarization state and the first electro-active lens element transmits light in the second polarization state without focusing the light in the second polarization state.

In other embodiments, one or more of the lens elements may provide two focusing states with different optical powers instead of a focusing and non-focusing state. For example, an electro-active lens may include a first lens element that switches between a first focusing state and a second focusing state, each focusing state having a different optical power, and a second lens element that switches between a focusing state and a non-focusing state. The focusing state of the second lens element may have the same optical power as the first focusing state of the first lens element. In this way, one state of the electro-active lens focuses light in two different polarization states with a single optical power to provide higher contrast and clarity at this optical power, and other states of the electro-active lens may provide simultaneous focusing at multiple optical powers.

The electro-active lens system may be switched between states using any of several methods. System switching may be initiated by a user of the electro-active lens system. In one embodiment, a user may initiate switching of one or more of the lens elements in the electro-active lens system using a manual switch coupled to the power supply supplying power to the electro-active lens system. In another embodiment, a user may initiate switching of a lens element using an eye movement or facial movement. In this embodiment, the electro-active lens system includes a detector coupled to the power supply for detecting user eye movement and/or facial movement. In another embodiment, the electro-active lens system includes a processor electrically coupled to the power supply to control the lens elements. The processor may be programmed to automatically cycle between switching states at a predetermined rate of speed. In another embodiment, the electro-active lens system includes a microphone coupled to a processor to receive voice commands from the user to switch the focusing state of the electro-active lens elements.

Figure 11:
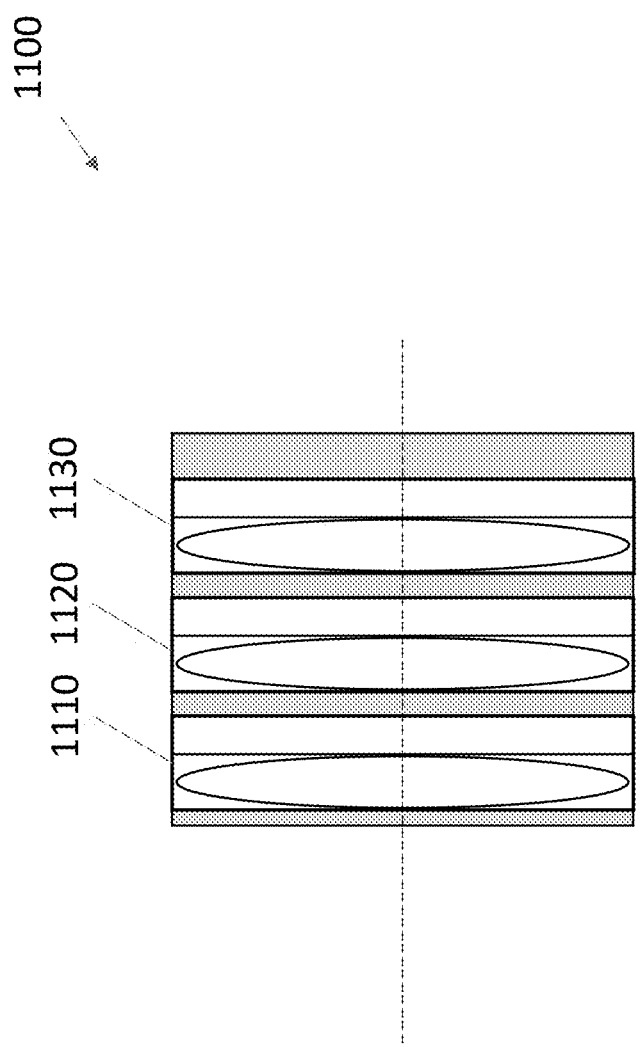
FIG. 11 shows an electro-active lens with three electro-active lens elements.

FIG. 11 shows an electro-active lens 1100 with three lens elements 1110, 1120, and 1130. Such a configuration is similar to a two-lens configuration, except that the alignment layer rub directions for each lens element are in 45 degree increments of rotation rather than 90 degrees. For example, lens element 1110 may have an alignment layer rub direction aligned at zero degrees about the optical axis, lens element 1120 may have an alignment layer rub direction aligned at 45 degrees about the optical axis, and lens element 1130 may have an alignment layer rub direction aligned at 90 degrees about the optical axis.

Multifocal Electro-Active Lens Gun Scope

Figure 12:
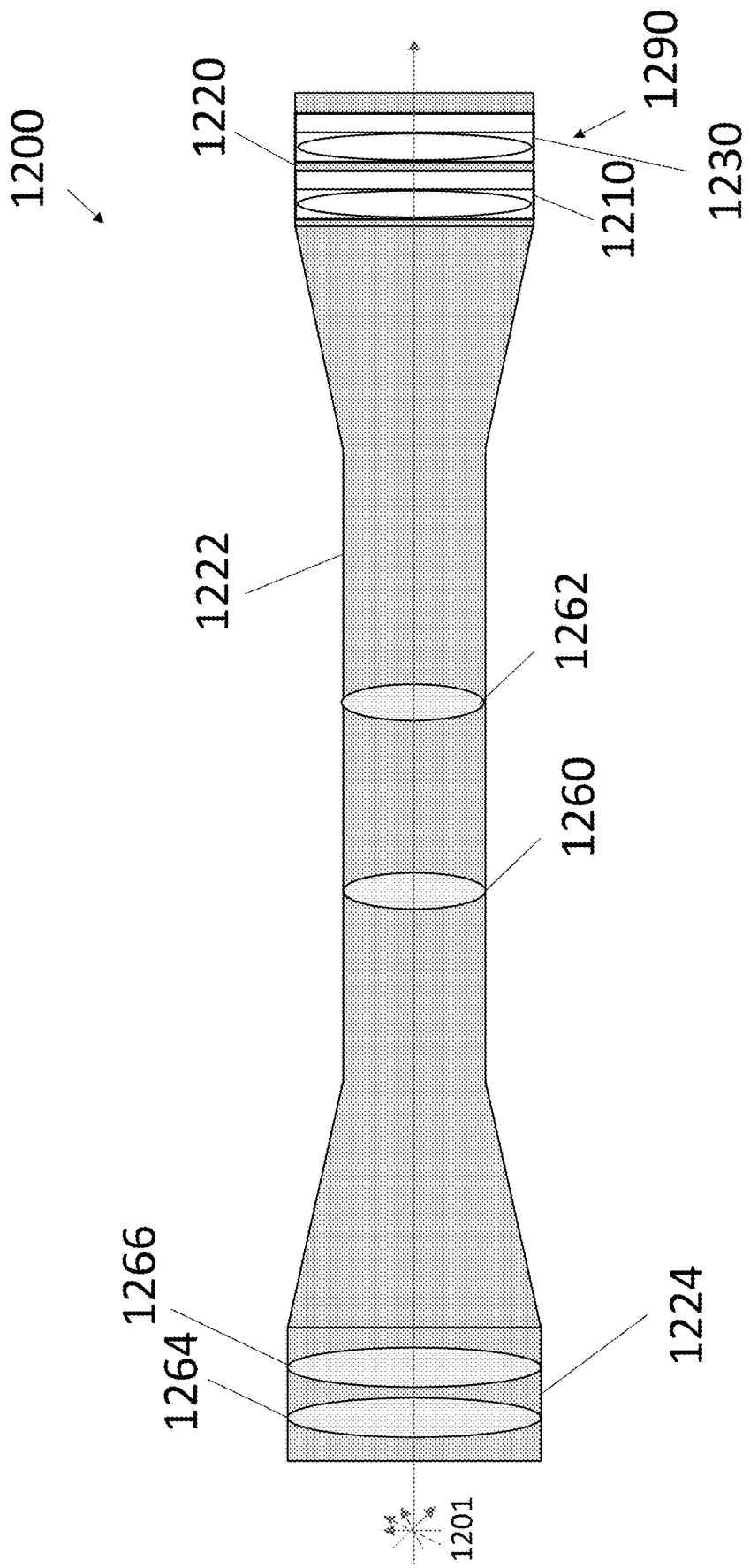
FIG. 12 shows a gun scope with an electro-active lens.

FIG. 12 shows an adjustable gun scope 1200 with an electro-active lens 1290 that can bring light in different polarization states of unpolarized light from near and far planes in focus at the same time. The gun scope 1200 can include an objective assembly 1224 disposed on one end of a scope tube 1222 and an ocular assembly 1220 disposed on an end of the scope tube 1222 opposite the objective assembly 1224. The objective assembly 1224 includes one or more optical elements (lenses) 1264 and 1266 for transmitting light 1201 back to the ocular assembly 1220. The scope tube 1222 also houses optical elements 1260 and 1262 that provide variable zoom. The scope 1200 may also include a reticle (e.g., crosshairs) for aiming and mounting elements (e.g., windage adjustment, elevation adjustment, and mounting rings) for mounting the scope to a weapon (e.g., a rifle, crossbow, machine gun, or pistol).

As mentioned above, the ocular assembly 1220 includes an electro-active lens 1290 like the one in FIGS. 8A and 8B for bringing different polarization components of unpolarized light 1201 from different planes (e.g., near and far planes) into focus. The electro-active lens 1290 includes a first lens element 1210 and a second lens element 1230 with crossed eigenaxes (alignment directions) and no polarizers as described above. The lens elements 1210 and 1230 provide different optical powers for light polarized along different (orthogonal) alignment directions. Put differently, the lens elements 1210 and 1230 are aligned so that their optical axes are coincident but their eigenaxes are rotated by 90° with respect to each other—the first lens element's focusing eigenaxis is parallel with the second lens element's transmitting eigenaxis, and the first lens element's transmitting eigenaxis is parallel with the second lens element's focusing eigenaxis. The lens elements 1210 and 1230 can be actuated as described above with respect to FIG. 9.

In an alternative embodiment of the scope, the scope includes a conventional ocular assembly and the electro-active lens 1290 is an additional optical component. In this embodiment, the electro-active lens 1290 is disposed in optical series with the other optical components in the scope, either in the scope tube 1222 between the objective assembly 1224 and the conventional ocular assembly or adjacent to the side of the conventional ocular assembly closer to the eye.

The switchable states of this scope device can provide two focus distances simultaneously with the option of selecting only one or the other. For example, if a user is monitoring two targets (e.g., a closer target and a farther target), the two-simultaneous-focus mode can be employed to keep both targets in focus (similar to State 4 in FIG. 9). Once a decision is made to narrow the targets down to only one target, the user can switch the electro-active lens 1290 to the one-focus-only mode to concentrate more on that target (either the closer target or the farther target), with better focus and higher contrast.

Figure 13:
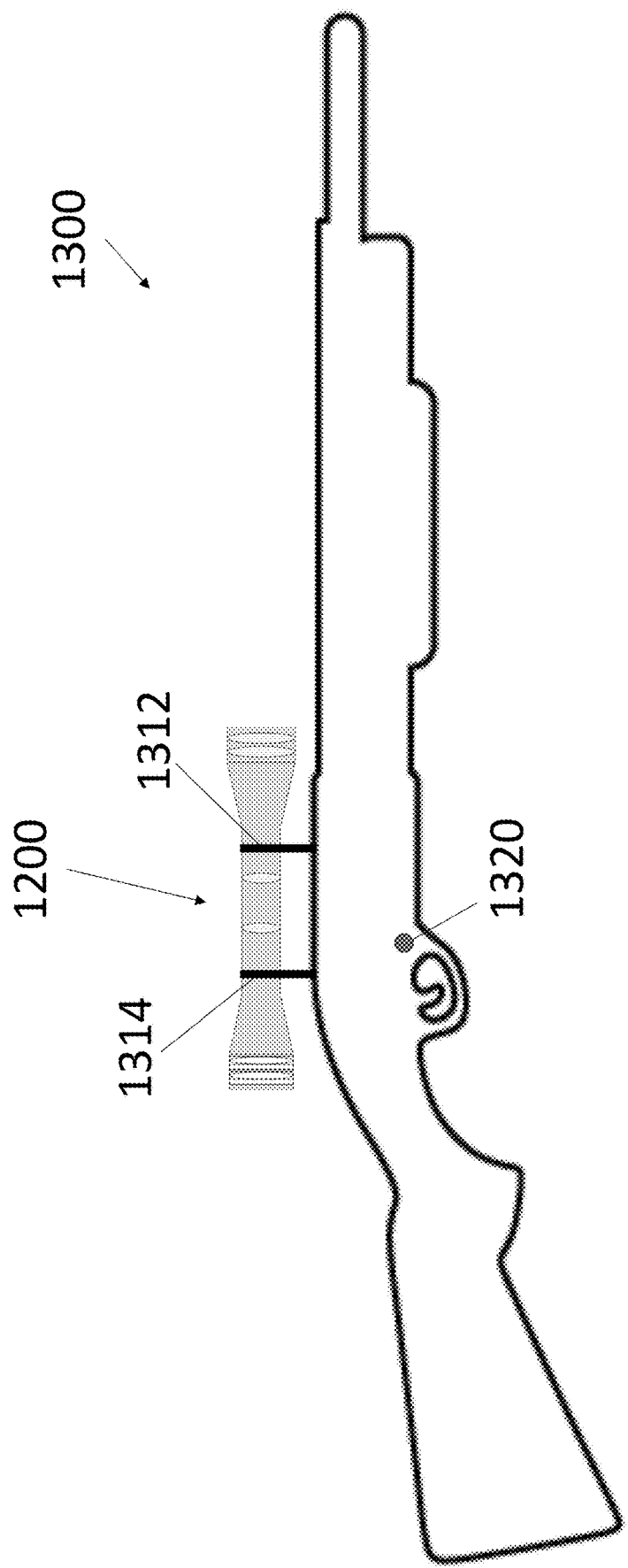
FIG. 13 shows a rifle with the gun scope of FIG. 12.

FIG. 13 shows the scope 1200 of FIG. 12 mounted onto a rifle 1300 with mounting rings 1312 and 1314. The rifle 1300 includes a switch 1320 mounted near the trigger guard. The switch 1320 is close enough to the trigger and trigger card that the shooter can actuate the switch without shifting their hand, their body, or the rifle 1300. The switch 1320 is coupled to the scope 1200 and is used to switch the electro-active lens 1290 in the scope 1200 among its different states. Preferably, the switch 1320 includes a wireless transmitter and the scope 1200 includes a wireless receiver to provide wireless coupling between the switch 1320 and the scope 1200. In another embodiment, the switch 1320 is coupled to the scope 1200 via a wire or other physical connection. In another embodiment the switch 1320 could be controlled by a "spotter," which is a second person assisting the shooter in finding targets. Many other switching methods can be utilized, which are known to those skilled in the art of human control factors.

The electro-active lens 1290 is powered by a power source (e.g., a rechargeable battery or a capacitor). The power source is disposed either inside the scope housing, inside the rifle housing, or on a surface of the scope housing or rifle housing. A processor is operably coupled to the electro-active lens 1290 and provides control of the electro-active lens 1290. The processor is disposed either inside the scope housing, inside the rifle housing, or on a surface of the scope housing or rifle housing. The processor also provides voltage gradients and amplitudes to control the electro-active lens 1290.

Other Applications of a Multifocal Electro-Active Lens

Besides rifle shooting, there are many other applications where a multifocal electro-active lens may be useful. For example, the multifocal electro-active lens may be used when playing billiards to align the cue to the cue ball and the target ball along with the intended destination of the target ball. As another example, the multifocal electro-active lens may be used when driving a vehicle so that the dashboard instruments in the car can be viewed while still having the road in focus. As another example, the multifocal electro-active lens may be used when playing sports that require catching a ball, where the ball is initially distant and gets closer. As another example, the multifocal electro-active lens may be used when playing racquet sports using a close focus when hitting the ball and also using a distant focus to keep track of the ball when it is farther away. The multifocal electro-active lens may also be used while cooking food so that recipes can be read while still keeping the cooking equipment and food in focus. The multifocal electro-active lens may also be used by a pilot flying an aircraft so that the pilot can view close objects such as the instruments while still maintaining distant focus. The multifocal electro-active lens may also be used when playing card games, so that a player can view the cards in their hand while still observing the other players. The multifocal electro-active lens may also be used when performing medical procedures, so that the medical practitioner can clearly see the patient while also checking distant diagnostic equipment readings. The multifocal electro-active lens may be used while typing to allow the keyboard to be in focus while simultaneously seeing objects further away, such as monitors or documents. The multifocal electro-active lens may be used by a worker in an industrial environment, where the worker wants to focus on a measurement device (e.g., a voltmeter), while still being able to see the object being measured (e.g., a circuit) that is further away.

The multifocal electro-active lens can be employed in any of several optical devices. For example, the lenses can be mounted in spectacle frames, contact lenses, or intraocular lenses.

Figure 14A:
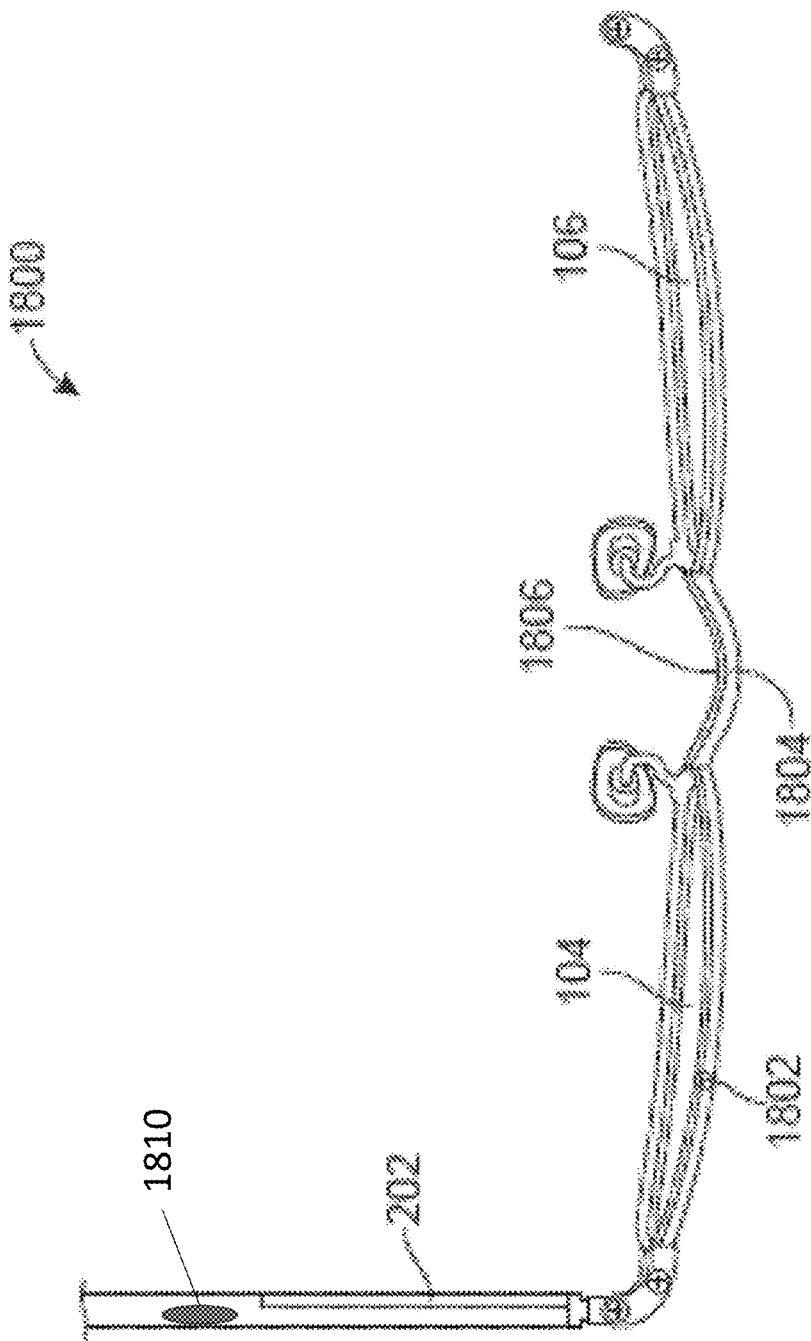
FIG. 14A shows a multifocal electro-active lens disposed in spectacles.

FIG. 14A shows multifocal electro-active spectacles 1800. The electro-active spectacles 1800 can include an electronic module 202 disposed in one or both temples of the spectacles. The electronic module 202 may include a power supply and/or a processor. The electronic module 202 may be electrically coupled to the multifocal electro-active lenses 104 and 106 via conductive links 1802. The multifocal electro-active lenses 104 and 106 may have rotated electro-active lens elements without polarizers like the electro-active lens 800 in FIG. 8A. Conductive links 1802 can include any number of conductive elements (e.g., flex ribbon connectors) that provide electrical connectivity between the electronic module 202 and the multifocal electro-active lenses 104 and 106. In other embodiments, the multifocal electro-active spectacles may have only one multifocal electro-active lens and the other lens may be a conventional lens. Similar to the multifocal electro-active spectacles, other embodiments of the present technology include multifocal electro-active sunglasses. For more on electro-active spectacles, see, e.g., U.S. Patent Application No. 2020/0225511 A1, which is incorporated herein by reference in its entirety.

In operation, the multifocal electro-active spectacles 1800 may be switched between different focusing states (multi-focal and single focus states) in one of several ways. In one embodiment, the spectacles 1800 may include a button 1810 (e.g., a capacitive touch switch) disposed on the temple of the spectacles and operably coupled to module 202. A wearer of the spectacles can use the button 1810 to switch between focusing states. The spectacles may also be switched using a detector coupled to the spectacles and operably coupled to the module 202 to detect an eye movement or facial movement of the wearer of the spectacles. The processor in the module 202 may be programmed to automatically cycle between switching states at a predetermined rate of speed. The spectacles 1800 may also include an antenna to receive signals from a remote device (e.g., a smart phone) to switch focusing states.

Figure 14B:
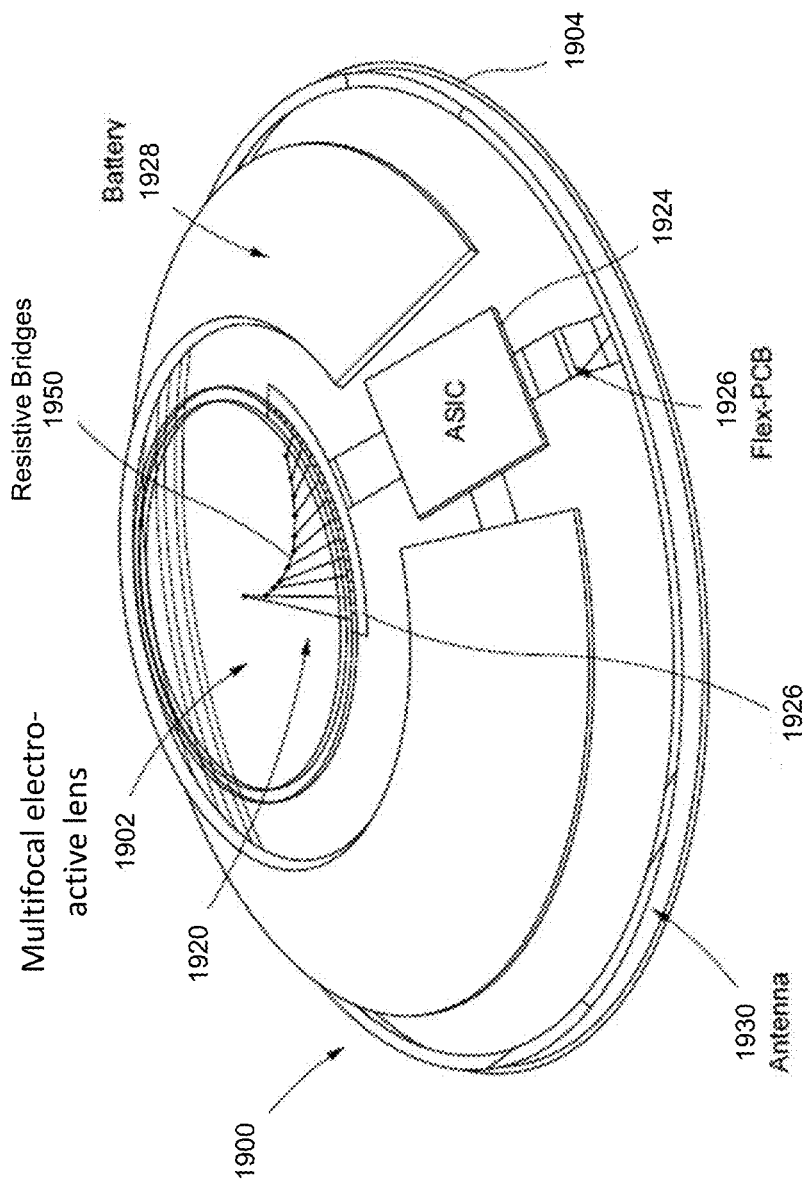
FIG. 14B shows a multifocal electro-active lens disposed in a contact lens.

FIG. 14B shows a multifocal electro-active contact lens 1900. The multifocal electro-active contact lens 1900 includes a multifocal electro-active lens 1902 with rotated electro-active lens elements and no polarizers like the electro-active lens 800 in FIG. 8A. The contact lens 1900 includes buss lines 1920 to provide electrical power to the electrodes in the electro-active lens 1902. The electro-active lens 1902 may include resistive bridges 1950 that electrically couple electrodes in the electro-active lens 1902 that are not directly coupled to the buss lines 1920. The buss lines may connect to a bus 1922 which connects to a processor (here, an ASIC 1924) via a flexible printed circuit board (PCB) 1926. The flexible PCB 1926 may also connect the ASIC 1924 to a ring-shaped power battery 1928 and (optionally) a ring-shaped antenna 1930, both of which are concentric with the electro-active lens 1902. All of these components can be affixed to or completely or partially embedded in a base optical element 1904. This base optical element 1904 may provide additional optical power—i.e., it may function as a fixed lens—and can be formed of any suitable material, include soft hydrogels like those used in soft contact lenses.

In operation, the contact lens 1900 may be switched between different focusing states (multifocal and single focus states) in one of several ways. One way that the contact lens may be switched is using the ASIC 1924, which may be programmed to automatically cycle between switching states at a predetermined rate of speed. Another way that the contact lens may be switched is using the antenna 1930, which may receive signals from a remote device (e.g., a smart phone) to switch focusing states.

Figure 14C:
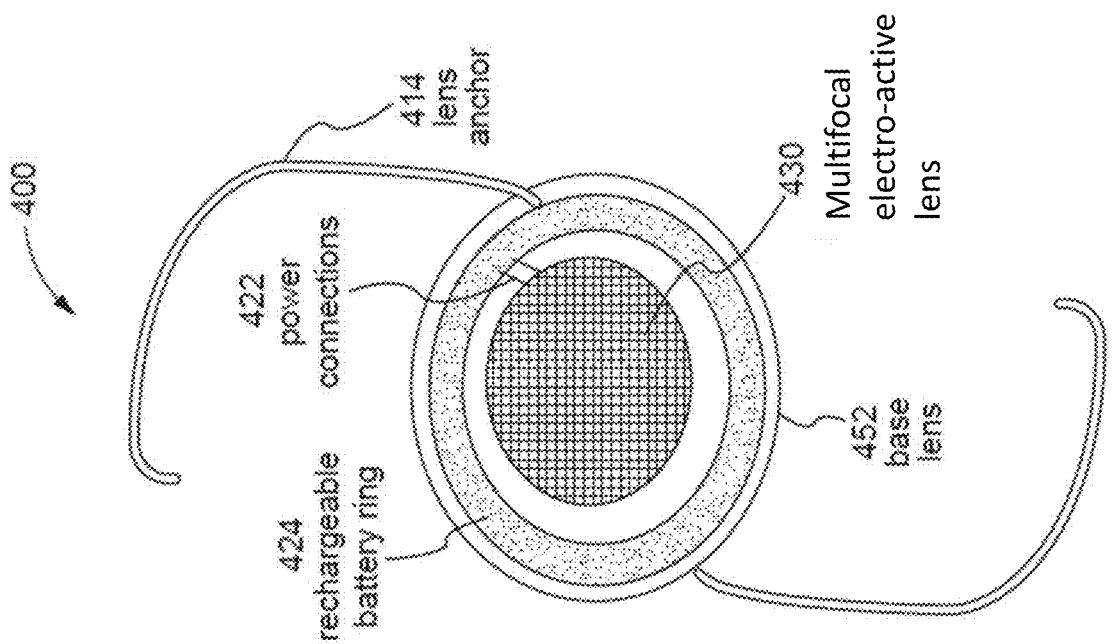
FIG. 14C shows a multifocal electro-active lens disposed in an intraocular lens.

FIG. 14C shows a multifocal electro-active intraocular lens 400 having a multifocal electro-active lens 430 and a rechargeable battery ring 424. The multifocal electro-active lens 430 may have rotated electro-active lens elements without polarizers like the electro-active lens 800 in FIG. 8A. Lens anchors 414 may be used to stabilize and position the multifocal electro-active lens 430 in the desired location and orientation. The rechargeable battery ring 424 may be inductively powered by an external device. Other sources of power may include harnessing the mechanical energy of body movements, solar cells, and conductive charging. Power connections 422 electrically couple the battery 424 to the multifocal electro-active lens 430. An optional base lens 452 may provide a base refractive power using a conventional lens configuration. The base lens 452 may also encapsulate the electro-active lens 430 in a hermetically sealed enclosure that consists of a biocompatible material similar to those materials currently used to make IOLs, by way of example only, soft acrylic or solid medical-grade silicone. The intraocular lens 400 includes a processor coupled to the rechargeable battery ring 424 to control the switching state of the multifocal electro-active lens 430. The intraocular lens 400 may optionally include an antenna for receiving signals from a remote device. For more on electro-active intraocular lenses, see, e.g., U.S. Patent Application No. 2019/0110887 A1, which is incorporated herein by reference in its entirety. In operation, the processor may be programmed to automatically cycle between switching states at a predetermined rate of speed. Alternatively, the intraocular lens 400 may be configured to switch between switching states when the antenna receives a signal from a remote device (e.g., a smart phone).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electro-active lens comprising:
  a first liquid crystal layer configured to be switched between state A in which the first liquid crystal layer provides a first optical power for light in a first polarization state and zero optical power for light in a second polarization state different than the first polarization state and state B in which the first liquid crystal layer provides a second optical power different than the first optical power for light in the first polarization state and zero optical power for light in the second polarization state; and
  a second liquid crystal layer in optical series with the first liquid crystal layer and configured to be switched between state C in which the second liquid crystal layer provides a third optical power different than the first optical power and the second optical power for the light in the second polarization state and zero optical power for the light in the first polarization state and state D in which the second liquid crystal layer provides a fourth optical power for light in the second polarization state and zero optical power for light in the first polarization state.

2. The electro-active lens of claim 1, further comprising:
  a substrate partially defining one side of a first cavity and one side of a second cavity,
  wherein the first liquid crystal layer is disposed within the first cavity and the second liquid crystal layer is disposed within the second cavity.

3. The electro-active lens of claim 1, further comprising:
  a first substrate;
  a first electrically conductive layer disposed on a surface of the first substrate;
  a second substrate forming a first cavity with the first substrate in which the first liquid crystal layer is disposed;
  a second electrically conductive layer disposed on a first surface of the second substrate opposite the surface of the first substrate;
  a first alignment layer having a first alignment direction disposed on one of the first electrically conductive layer or the second electrically conductive layer;
  a third electrically conductive layer disposed on a second surface of the second substrate;
  a third substrate forming a second cavity with the second substrate in which the second liquid crystal layer is disposed;
  a fourth electrically conductive layer disposed on a surface of the third substrate opposite the second surface of the second substrate; and
  a second alignment layer having a second alignment direction disposed on one of the third electrically conductive layer or the fourth electrically conductive layer.

4. The electro-active lens of claim 3, wherein the first alignment direction is different than the second alignment direction.

5. The electro-active lens of claim 4, wherein the first alignment direction is orthogonal to the second alignment direction.

6. The electro-active lens of claim 3, wherein:
  the first alignment layer is disposed on the first electrically conductive layer, and
  the electro-active lens further comprises:
    a third alignment layer having a third alignment direction disposed on the second electrically conductive layer.

7. The electro-active lens of claim 6, wherein:
  the first alignment direction is aligned parallel with the third alignment direction.

8. The electro-active lens of claim 6, wherein:
  the first alignment direction is aligned anti-parallel with the third alignment direction.

9. The electro-active lens of claim 6, wherein:
  the second alignment layer is disposed on the third electrically conductive layer, and
  the electro-active lens further comprises:
    a fourth alignment layer having a fourth alignment direction disposed on the fourth electrically conductive layer.

10. The electro-active lens of claim 3, wherein:
  the first electrically conductive layer comprises a first plurality of electrodes;
  the second electrically conductive layer comprises a first ground electrode;
  the third electrically conductive layer comprises a second ground electrode; and
  the fourth electrically conductive layer comprises a second plurality of electrodes.

11. The electro-active lens of claim 10, wherein:
  the first plurality of electrodes comprises a first plurality of concentric ring electrodes; and
  the second plurality of electrodes comprises a second plurality of concentric ring electrodes.

12. The electro-active lens of claim 3, wherein:
the first electrically conductive layer comprises a first ground electrode;
the second electrically conductive layer comprises a first plurality of electrodes;
the third electrically conductive layer comprises a second plurality of electrodes; and
the fourth electrically conductive layer comprises a second ground plane.

13. The electro-active lens of claim 12, wherein:
the first plurality of electrodes comprises a first plurality of concentric ring electrodes; and
the second plurality of electrodes comprises a second plurality of concentric ring electrodes.

14. The electro-active lens of claim 1, wherein the first liquid crystal layer comprises a nematic liquid crystal material.

15. The electro-active lens of claim 1, wherein:
the first liquid crystal layer is in a first lens element; and
the second liquid crystal layer is in a second lens element.

16. The electro-active lens of claim 1, wherein:
the first optical power is between about 1/4 Diopters and about 5 Diopters;
the second optical power is between about 0 Diopters and about 5 Diopters;
the third optical power is between about 1/4 Diopters and about 5 Diopters; and
the fourth optical power is between about 0 Diopters and about 5 Diopters.

17. The electro-active lens of claim 16, wherein the second optical power is the same as the fourth optical power.

18. The electro-active lens of claim 16, wherein:
the second optical power is 0 Diopters; and
the fourth optical power is 0 Diopters.

19. An electro-active lens comprising:
a first liquid crystal layer disposed in a first cavity and configured to be switched between state A and state B;
a second liquid crystal layer disposed in a second cavity in series with the first liquid crystal layer and configured to be switched between state C and state D,
wherein:
state A provides a first optical power for light in a first polarization state and zero optical power for light in a second polarization state,
state B provides a second optical power different than the first optical power for light in the first polarization state,
state C provides a third optical power different than the first optical power and the second optical power for the light in the second polarization state and zero optical power for the light in the first polarization state, and
state D provides a fourth optical power for light in the second polarization state.

* * * * *